US010917666B2

United States Patent
Sarkar et al.

(10) Patent No.: US 10,917,666 B2
(45) Date of Patent: *Feb. 9, 2021

(54) PROVIDING A START TRIGGER FOR A LIVE VIDEO BROADCAST

(71) Applicant: Facebook, Inc., Menlo Park, CA (US)

(72) Inventors: Shilpa Sarkar, San Francisco, CA (US); Hui Ding, Sunnyvale, CA (US); Ian McIntyre Silber, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,482

(22) Filed: Feb. 15, 2019

(65) Prior Publication Data
US 2019/0182513 A1    Jun. 13, 2019

Related U.S. Application Data

(63) Continuation of application No. 15/495,013, filed on Apr. 24, 2017, now Pat. No. 10,250,914.

(51) Int. Cl.
*H04N 21/2187*    (2011.01)
*H04N 21/24*    (2011.01)
(Continued)

(52) U.S. Cl.
CPC ......... *H04N 21/2187* (2013.01); *G06Q 30/00* (2013.01); *G06Q 30/0241* (2013.01); *G06Q 50/01* (2013.01); *H04H 60/45* (2013.01); *H04H 60/46* (2013.01); *H04N 21/234* (2013.01); *H04N 21/2407* (2013.01); *H04N 21/41407* (2013.01);
(Continued)

(58) Field of Classification Search
CPC ........... H04N 21/2187; H04N 21/2407; H04N 21/234; H04N 21/8545; H04N 21/431; H04N 21/41407; H04N 21/4788
See application file for complete search history.

(56) References Cited

U.S. PATENT DOCUMENTS 7,996,566 B1    8/2011    Sylvain et al.
8,813,149 B2 *  8/2014    Marignan .......... H04N 7/17318
                                                    725/109
(Continued)

OTHER PUBLICATIONS

U.S. Appl. No. 15/495,013, Jun. 15, 2018, Office Action.
U.S. Appl. No. 15/495,013, Sep. 20, 2018, Office Action.
U.S. Appl. No. 15/495,013, Nov. 28, 2018, Notice of Allowance.

*Primary Examiner* — Oschta I Montoya
(74) *Attorney, Agent, or Firm* — Keller Jolley Preece

(57) ABSTRACT

The present disclosure is directed toward systems and methods for providing a start trigger for a live video broadcast. In particular, in some embodiments the systems and methods described herein provide a live video stream received from a broadcaster client device to one or more viewer client devices. Additionally, the systems and methods described herein determine whether an audience satisfies a triggering event to provide the video stream to an audience of viewers. The systems and methods provide content for a wait screen in response to determining that the audience does not satisfy the triggering event, and provide the video stream in a live broadcast in response to determining that the audience does satisfy the triggering event.

20 Claims, 16 Drawing Sheets

(51) Int. Cl.

| | |
|---|---|
| *H04N 21/234* | (2011.01) |
| *H04N 21/8545* | (2011.01) |
| *H04N 21/431* | (2011.01) |
| *H04N 21/414* | (2011.01) |
| *H04N 21/4788* | (2011.01) |
| *G06Q 30/00* | (2012.01) |
| *H04H 60/45* | (2008.01) |
| *H04H 60/46* | (2008.01) |
| *G06Q 50/00* | (2012.01) |
| *G06Q 30/02* | (2012.01) |

(52) U.S. Cl.
CPC ....... *H04N 21/431* (2013.01); *H04N 21/4788* (2013.01); *H04N 21/8545* (2013.01)

(56) References Cited

U.S. PATENT DOCUMENTS

| | | | |
|---|---|---|---|
| 8,935,713 B1 | 1/2015 | Gabel et al. | |
| 2008/0034041 A1* | 2/2008 | Kang | H04N 21/25866 709/205 |
| 2014/0173648 A1* | 6/2014 | Ball | H04N 21/25 725/25 |
| 2014/0330782 A1* | 11/2014 | Abuelsaad | H04L 67/1095 707/634 |
| 2015/0089370 A1* | 3/2015 | Tang | G06F 16/986 715/716 |
| 2015/0245079 A1* | 8/2015 | Tremblay | H04H 20/18 725/116 |
| 2016/0381427 A1* | 12/2016 | Taylor | G06Q 30/00 725/13 |
| 2017/0064399 A1* | 3/2017 | Jabara | H04L 51/04 |
| 2018/0310031 A1 | 10/2018 | Sarkar et al. | |

\* cited by examiner

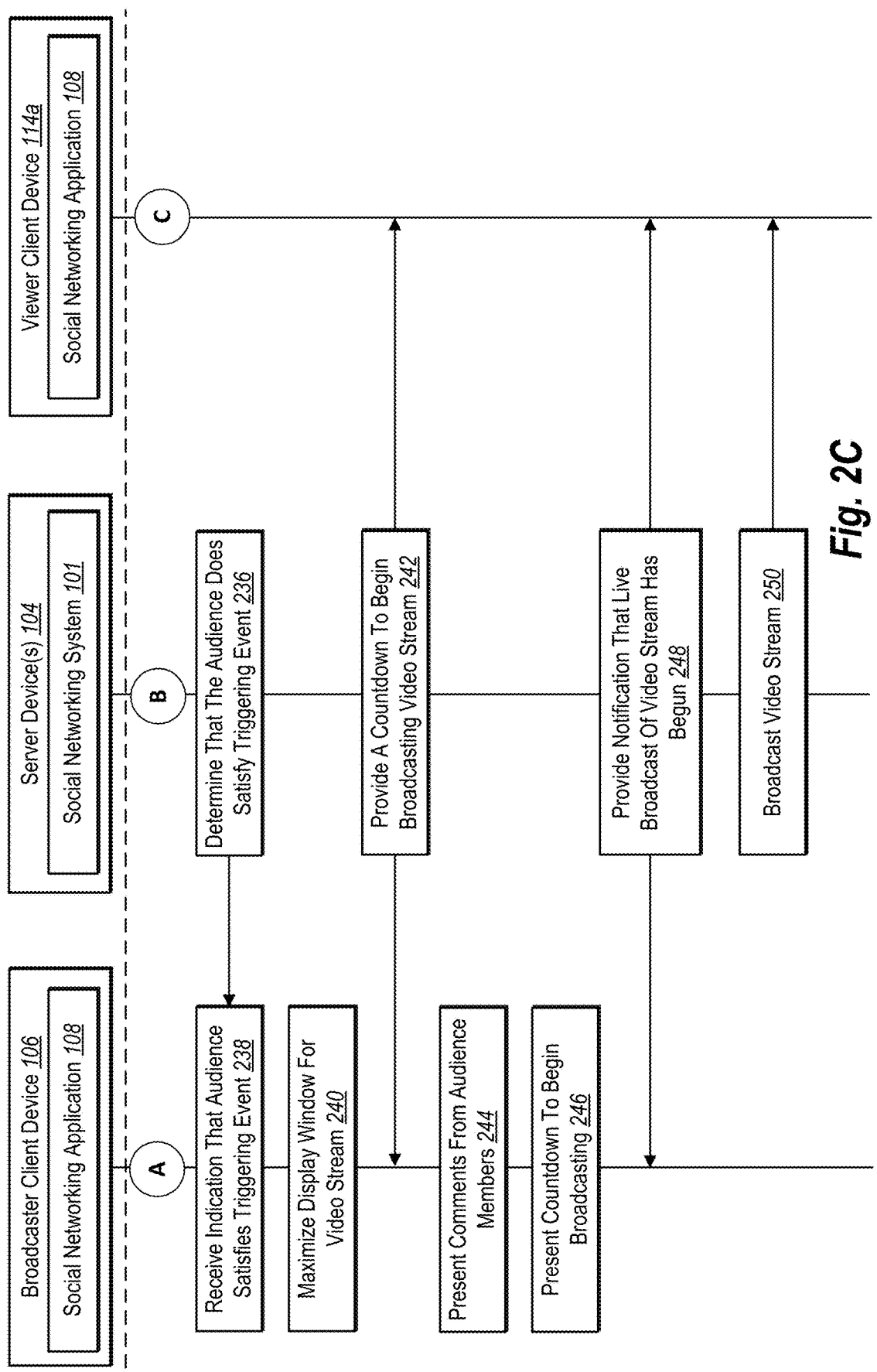

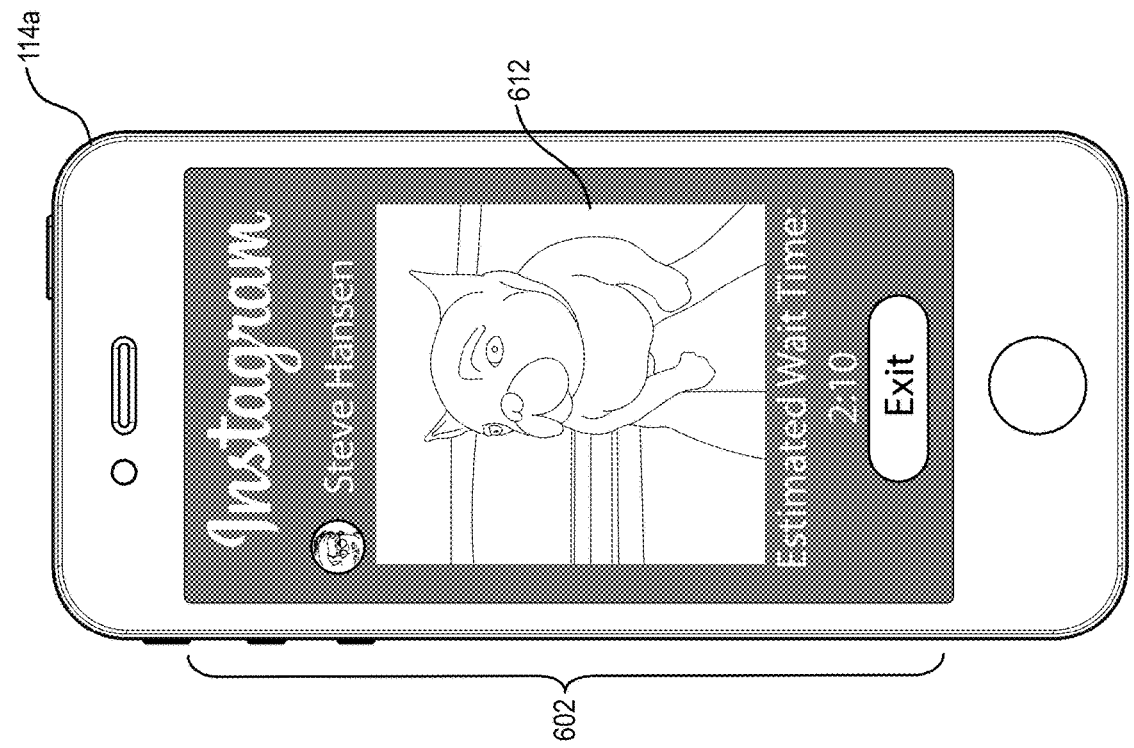

PROVIDING A START TRIGGER FOR A LIVE VIDEO BROADCAST

CROSS-REFERENCE TO RELATED APPLICATIONS

This application is a continuation of U.S. patent application Ser. No. 15/495,013, filed Apr. 24, 2017, with is incorporated by reference herein for all purposes.

BACKGROUND

As a result of the proliferation of smartphones and other computing devices, individuals have access to many forms of digital communication that allow individuals to communicate with large groups of people across the world (e.g., through a social network or other communication system/service). For example, various conventional systems allow an individual to communicate with an audience of users (e.g., other users of a communication system/service) by, for example, sharing a post, updating a status, or sharing a picture or video. While many conventional systems are effective in allowing individuals to communicate a message with an audience, these conventional systems have various disadvantages. For example, although some conventional systems permit users to broadcast video content to a plurality of viewers, these systems and corresponding broadcast services suffer from a number of inefficiencies and inconveniences.

To illustrate, some conventional video broadcast systems do not effectively provide a broadcaster the ability to control a broadcast and monitor audience participation in the broadcast. From the perspective of a broadcaster that shares content (e.g., a video broadcast) within conventional systems, a broadcaster often cannot accurately gauge the interest of an audience and/or adjust one or more aspects of the broadcast accordingly. In cases where a broadcaster desires to communicate with a large audience of viewers and/or a certain type of audience, conventional systems inhibit the broadcaster from controlling the broadcast in a way to achieve this goal. As a result, conventional systems often fail to create a satisfying broadcasting experience between a broadcaster and viewers within an audience.

These and other disadvantages exist with regard to conventional communication systems that permit a user to broadcast live video to other users.

SUMMARY

One or more embodiments described herein provide benefits and solve one or more of the foregoing or other problems in the art with systems and methods for providing live video broadcasts (e.g., via a social networking system). In general, the systems and methods provide options for controlling when to begin a live video broadcast. In particular, the disclosed systems and methods provide options for triggering when to begin the live video broadcast based on one or more characteristics of viewers of the live video broadcast. As an example, in some embodiments the disclosed system automatically triggers the beginning of a live video broadcast based how many viewers have joined an audience for the broadcast. As another example, in some embodiments the system automatically triggers the beginning of a broadcast based on an influence (e.g., number of followers) of viewers or a particular viewer that has joined an audience for the broadcast. While viewers wait for a broadcast to start, the systems and methods disclosed herein provide content and/or other information relating to the broadcast. For example, in some embodiments the systems and methods provide a digital waiting room or lobby to engage viewing users while initializing the broadcast of the video stream.

The disclosed system also provides broadcasters and viewers options for continuing to consume and/or create content while waiting for a broadcast to start. For example, in some embodiments, the disclosed system minimizes a graphical user interface associated with a broadcast that is waiting to begin while the user views content with a newsfeed or while the user posts content to the user's profile within the system. Accordingly, the broadcasting user is able to achieve desired goals with regard to a broadcast's audience, while not wasting time waiting for the broadcast to begin. Similarly, the viewers are able to continue to consume and/or create content while waiting for the broadcast to start, thus minimizing any resulting inconvenience caused by the wait.

Additionally, the systems and methods provide audience participation information to the broadcasting user. For example, the systems and methods provide to the broadcasting user, simultaneously with providing the waiting room content to the viewing users, information regarding viewing users and/or audience capacity to enable the broadcasting user to optimize audience participation. The systems and methods also provide audience responses and/or reactions to the broadcasting user and/or the viewing users upon broadcasting the video stream.

Furthermore, the systems and methods provide a more satisfying user experience by increasing user engagement. In particular, the systems and methods increase user engagement by providing pre-show content to viewing users to maintain an audience in anticipation of a live broadcast of a video stream by a broadcasting user.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 2A-2C illustrate a sequence flow diagram for a live video broadcasting system in accordance with one or more embodiments;

FIGS. 6A-6C illustrate a series of graphical user interfaces for providing content for a wait screen on a viewer client device in accordance with one or more embodiments;

DETAILED DESCRIPTION

Figure 1:
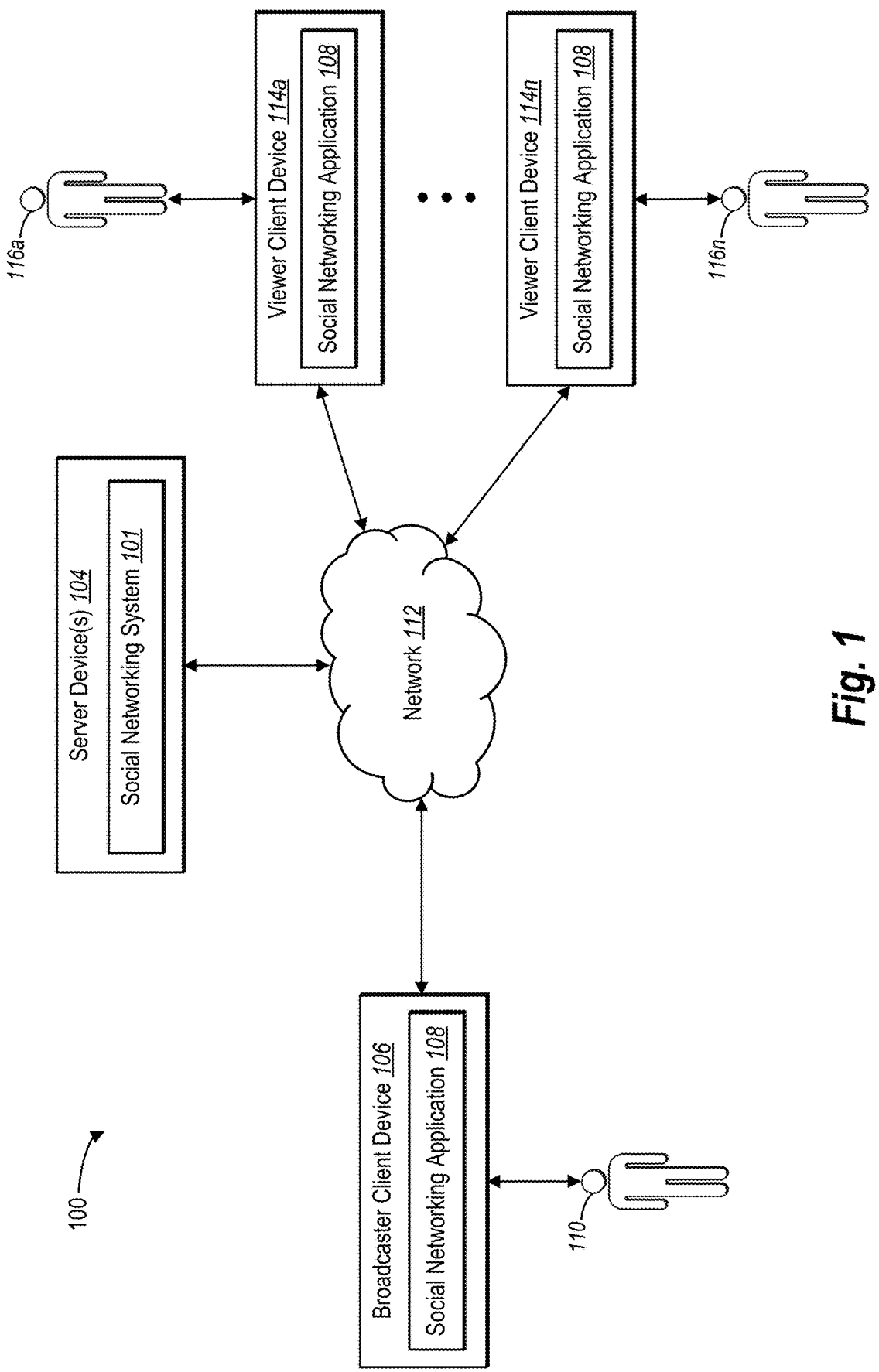
FIG. 1 illustrates a schematic diagram of an example live video broadcast system in accordance with one or more embodiments.

One or more embodiments described herein provide benefits and solve one or more of the foregoing or other problems in the art with a live video broadcast system that provides a start trigger for a live video broadcast. For example, in some embodiments, the system receives a request to begin a live video broadcast from a broadcaster client device (e.g., a mobile device associated with a broadcaster or broadcasting user). Additionally, the system receives a video stream for the live video broadcast from the broadcaster client device and provides a notification to a number of viewer client devices (e.g., mobile devices associated with viewers or viewing users) that the broadcaster has initiated a live video broadcast. Based on requests from viewers by way of viewing client devices, the system adds viewers to an audience for the live video broadcast. The system determines whether the audience satisfies a triggering event to begin broadcasting the video stream received from the broadcaster client device. Depending on whether the audience does or does not satisfy the triggering event, the system determines whether to begin the broadcast (e.g., to begin providing the video stream to the viewer client devices).

In one or more embodiments, the system provides a broadcaster the ability to capture live video on a mobile device (e.g., a smartphone, tablet, etc.) and broadcast the captured video to viewers (e.g., friends or followers). For example, a social networking system, by way of a social networking application on a broadcaster client device, receives live video captured by the broadcaster client device as a video stream. In addition, the social networking system, by way of the social networking application on one or more viewer client devices, provides (e.g., broadcasts) the video stream as a live video broadcast to one or more viewers associated with the viewer client devices.

In some embodiments, the system receives a request to begin a live video broadcast from a broadcaster client device. In these or other embodiments, a broadcaster using an application on a mobile device selects an option within the application to capture and broadcast a live video stream by way of a camera on the mobile device. The live video broadcast system receives the request (e.g., as indicated by the broadcaster selecting the option to broadcast or "go live") from the broadcaster client device.

The live video broadcast system further receives the live video stream from the broadcaster client device. In other words, as the broadcaster captures video using his or her mobile device, the mobile device transmits the captured video to the live video broadcast system. The live video broadcast system thereby receives the captured video as a video stream available for broadcast to viewer client devices.

In the same or other embodiments, the live video broadcast system provides a notification that the broadcaster has initiated a live video broadcast to a number of viewer client devices. The live video broadcast system provides the notification to inform co-users (e.g., "friends" or "followers" of the broadcaster) that the broadcaster has requested to begin broadcasting a live video stream.

The viewers choose to join an audience for the live video broadcast from within the social networking application on the viewer client devices. For example, in some embodiments the viewers select an option (e.g., a link or button) to view the live video broadcast originating at the broadcaster client device. The live video broadcast system adds viewers to an audience for the live video broadcast based on the requests by the viewers to view the live video broadcast.

In the same or alternative embodiments, the live video broadcast system determines whether the audience satisfies a triggering event associated with the live video broadcast. In other words, the live video broadcast system determines whether the audience causes a triggering event to occur, to which the system responds by beginning the broadcast and providing the live video stream to the viewer client devices.

As used herein, a triggering event is an event, occurrence, criterion, requirement, or other trigger that signifies when to begin a live video broadcast. For example, in some embodiments a triggering event is a requirement that must be satisfied before the system will begin broadcasting the video stream received from the broadcaster client device to the audience of viewer client devices. In other embodiments, the triggering event is an occurrence of a particular event or happenstance that, when detected, signals the system to broadcast the video stream received from the broadcaster client device to the viewer client devices. For example, in some embodiments the triggering event is a threshold audience size, where, upon a threshold number of viewers joining (e.g., being added to) the audience, the triggering event is satisfied. As another example, in other embodiments the triggering event is a determination that a particular user has joined the audience, where, upon that particular user joining the audience, the triggering event is satisfied. In still other embodiments, the triggering event is a timer, the expiration of which causes the live video broadcast system to broadcast the video stream. In yet other embodiments, the triggering event is a detection of a broadcaster selecting a broadcast option (e.g., "go live now" or "broadcast anyway"). In these embodiments, the live video broadcast system treats the detected selection of the option as a sort of override and thereby broadcasts the video stream regardless of other triggering events being satisfied. In yet further embodiments, the triggering event is some combination of conditions or events, such as a combination of two or more of the example events mentioned above.

In some embodiments, the system determines that the triggering event is satisfied or that the triggering event has occurred (e.g., that enough people have joined the audience to meet a threshold number). In other words, the system determines that the audience satisfies the triggering event. In any event, the live video broadcast system, in response to determining that the audience satisfies the triggering event, broadcasts the video stream captured by the broadcaster client device to the audience of viewer client devices that requested to view the video stream.

In the same or other embodiments, the live video broadcast system determines that the triggering event did not occur or has not yet occurred, or that the audience does not satisfy the necessary conditions to result in triggering the broadcast of the live video stream (e.g., the audience is still too small to meet the threshold number). In some embodiments, the system, in response to determining that the audience does not satisfy the triggering event, refrains from beginning the live video broadcast to the viewers (e.g., to the viewer client devices of the viewers in the audience). More detail is provided hereafter regarding the triggering event and how the audience may or may not satisfy the triggering event.

Accordingly, the live video broadcast system described herein provides broadcasters the ability to more effectively gather an audience. For example, in some embodiments the live video broadcast system provides a virtual waiting room or lobby (e.g., a wait screen) complete with content associated with the broadcaster presented to the viewers while the viewers wait for the broadcast to begin. Thus, the live video broadcast system engages viewers and retains a larger portion of viewership by providing content while the viewers wait for the broadcast of the live video stream to begin. This prevents problems with losing viewers who do not otherwise want to wait in dead space for the broadcast to begin.

Additionally, the live video broadcast system described herein enables broadcasters to more accurately gauge interest and participation of an audience. For instance, the live video broadcast system described herein provides means whereby users of the live video broadcast system (e.g., a broadcaster and one or more viewers) can communicate with each other (e.g., via a comment section) before the start of the live video broadcast. In this way, the live video broadcast system enables a broadcaster to monitor comments posted by viewers while the viewers are waiting for the video stream to begin broadcasting as well as during the broadcast of the video stream. The broadcaster can effectively gather information about audience opinion and attitude toward the upcoming broadcast as well an interact with audience members before the broadcast starts.

As a result of solving the above-described problems, the live video broadcast system described herein provides a more satisfying user experience by increasing user engagement. To elaborate, the live video broadcast system described herein facilitates an increased sense of engagement from one viewer to another and between the broadcaster and the viewers. Thus, the live video broadcast system creates an experience whereby viewers feel more personally invested in the broadcast through the broadcaster-audience relationship. As a result, the live video broadcast system creates a more satisfying shared experience between a broadcaster and viewers within an audience by increasing user engagement.

In addition to more accurately gauging audience participation and providing a more satisfying user experience, the live video broadcast system described herein exhibits superior performance to conventional systems. That is to say, the live video broadcast system is faster than conventional systems because the live video broadcast system described herein utilizes a start trigger to initiate streaming of a live video broadcast. In this way, the live video broadcast system described herein broadcasts uniformly to a gathered audience that satisfies a triggering event. By contrast, conventional system broadcasts are canceled and restarted by broadcasters and joined and left by viewers much more frequently. Accordingly, the live video broadcast system described herein is computationally less expensive and more efficient than conventional systems.

The live video broadcast system described herein further consumes less memory than conventional systems. By utilizing a triggering event, the live video broadcast system described herein more effectively gathers an audience than do conventional systems, and therefore the live video broadcast system described herein is not canceled and restarted due to unsatisfactory audience sizes as in conventional systems. Furthermore, unlike conventional systems, the live video broadcast system described herein more efficiently adds viewers to an audience while waiting for the broadcast to begin. Rather than inserting a viewer into an ongoing video stream as in conventional systems, the live video broadcast system accumulates viewers before broadcasting the live stream and thereby more easily adds viewers to an audience and broadcasts to all audience members uniformly (e.g., at substantially the same time). Thus, the live video broadcast system is not only faster than conventional systems but also requires less memory because it is computationally less expensive.

Additional detail will now be provided with regard to the figures. For example, FIG. 1 illustrates a schematic diagram of an example live video broadcast system 100 for implementing the live video broadcast system in accordance with one or more embodiments. An overview of the live video broadcast system 100 is described in relation to FIG. 1. Thereafter, a more detailed description of the components and processes of the live video broadcast system 100 is provided in relation to the subsequent figures.

As illustrated by FIG. 1, in one or more embodiments, the live video broadcast system 100 includes a broadcaster client device 106 associated with a broadcaster 110 (e.g., a broadcasting user). The live video broadcast system 100 also includes one or more viewer client devices 114a-114n (collectively referred to herein as "viewer client devices 114") associated with viewers 116 (e.g., viewing users collectively referred to herein as "viewers 116"). As shown in FIG. 1, viewer client device 114a is associated with viewer 116a and viewer client device 114n is associated with viewer 116n. As further shown in FIG. 1, the viewer client devices 114 and the broadcaster client device 106 communicate with server device(s) 104 via network 112. For example, and as FIG. 1 illustrates, server device(s) 104 can implement a social networking system 101 and/or one or more services thereof. In one or more embodiments, the broadcaster client device 106 and the viewer client devices 114 may directly communicate with the server device(s) 104, bypassing network 112.

Although FIG. 1 depicts the live video broadcast system 100 implemented across a social networking system 101 and multiple user devices running social networking applications 108, it will be understood that this is exemplary and that the live video broadcast system 100 may, in at least one embodiment, be implemented across a messaging system and user devices running messaging applications. Likewise, in at least one other embodiment, the live video broadcast system 100 may be implemented across any other communications system including user devices running communications applications suitable for broadcasting video streams to co-users (e.g., "friends" and/or "followers").

As further illustrated in FIG. 1, the live video broadcast system 100 includes any potential number of viewers 116 associated with corresponding viewer client devices 114. For discussion purposes, it will be beneficial to explain the operations and processes of the social networking system 101 with reference to a single viewer client device (e.g., viewer client device 114a). It will be understood, however, that the live video broadcast system 100 communicates with any number of viewer client devices 114.

The broadcaster client device 106 and the viewer client devices 114 can be any of various types of computing devices. For example, each of the broadcaster client device 106 and the viewer client devices 114 may be a mobile device such as a smartphone, PDA, tablet, laptop, etc. Additionally or alternatively, the broadcaster client device 106 and the viewer client devices 114 may include a non-mobile device such as a desktop computer or other type of computing device as explained further below with reference to FIG. 10. In addition, the broadcaster client device 106 and the viewer client devices 114 can include the same type of functionality, but need not be the same type of device.

As further illustrated in FIG. 1, the broadcaster client device 106 and the viewer client devices 114 can each include a social networking application 108. In one or more embodiments, the social networking application 108 is installed as software, hardware, or a combination of software and hardware on the broadcaster client device 106 and viewer client devices 114. In still other embodiments, the social networking application 108 is implemented across the live video broadcast system 100, where all or part of the software or hardware associated with the social networking application 108 is run on the broadcaster client device 106, the server device(s) 104, and/or the viewer client devices 114.

As will be described in more detail below with reference to FIGS. 3, 4A-4C, 5A-5B and 6A-6C, the components of the live video broadcast system 100 can provide, alone and/or in combination with the other components, one or more graphical user interfaces ("GUIs"). In particular, the social networking application 108 on each of the broadcaster client device 106 and the viewer client devices 114 can display one or more GUIs generated by the broadcaster client device 106, the viewer client devices 114, and/or the social networking system 101. The social networking application 108 can allow a user to interact with a collection of display elements provided within one or more GUIs for a variety of purposes as discussed in detail below with reference to subsequent figures.

As mentioned above, a broadcaster (e.g., broadcaster 110) can request to begin a live video broadcast of video to be captured by the broadcaster client device 106. As used herein, the term "broadcaster" means a user of the social networking system 101 or other communication system that provides a video presentation (e.g., a video stream or video broadcast) in near real time for broadcast by the system to an audience of viewing users or "viewers." The broadcaster 110 can be a person (e.g., individual end user) that uses the system and the viewers can be co-users (e.g., friends, followers, or other co-users) of the system. As used herein, the term "viewer" means a user of the social networking system 101 or other communication system that receives transmission or streaming of a video broadcast from the broadcaster 110 by way of an associated viewer client device 114a-114n.

As further shown in FIG. 1, the social networking system 101 can be any electronic or digital system that facilitates electronic communication between two or more computing devices (e.g., broadcaster device 106 and viewer client device 114a). For example, the social networking system 101 can include a messaging system, video sharing system, or other communication system. The details of the social networking system 101 are further described below with reference to FIGS. 11 and 12. In further embodiments, although various features are described herein with regard to social networking systems, the live video broadcast system 100 can be implemented with respect to any suitable networking or communication system, such as a messaging system.

As indicated above, the social networking system 101 can communicate with one or more of the viewer client devices 114 and the broadcaster client device 106 via the network 112. The network 112 may include one or more networks and may use one or more communication platforms or technologies suitable for transmitting data and/or communication signals, as further described with reference to FIGS. 10 and 11. Although FIG. 1 illustrates a particular arrangement of the server device(s) 104, broadcaster device 106, and viewer client devices 114, various additional or alternative arrangements are possible.

Generally speaking, the live video broadcast system 100 facilitates the broadcast of a video stream from the broadcasting client device 106 to one or more viewer client devices 114. As used herein, the term "video stream" refers to a digital media presentation that originates from a client device for presentation on one or more additional client devices. For example, a broadcaster client device can provide a video stream contemporaneously with capturing the streamed video content using a camera on the broadcaster client device (e.g., the video stream is a real-time or near real-time broadcast of captured video content).

Figure 2A:
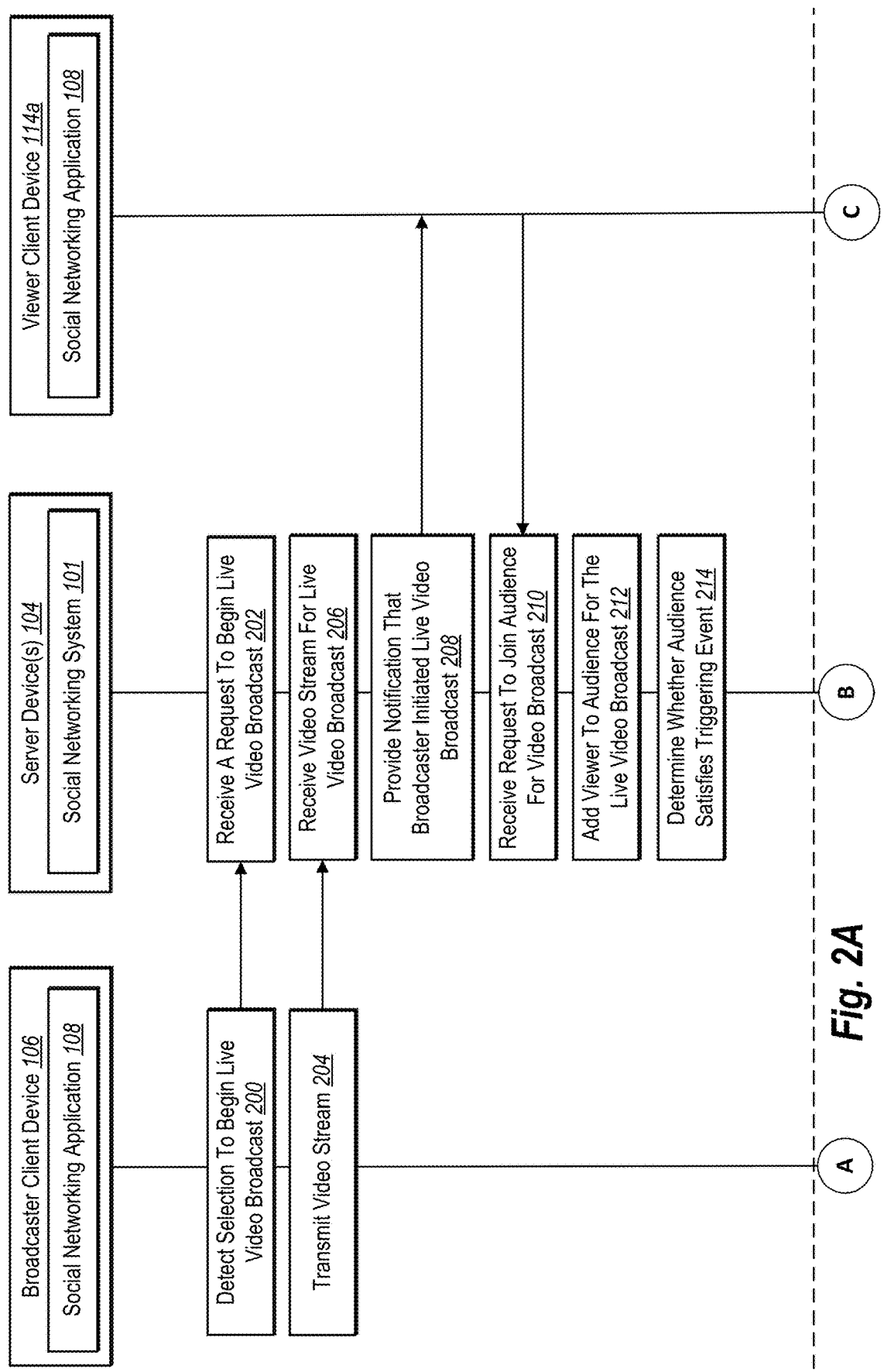
Figure 2B:
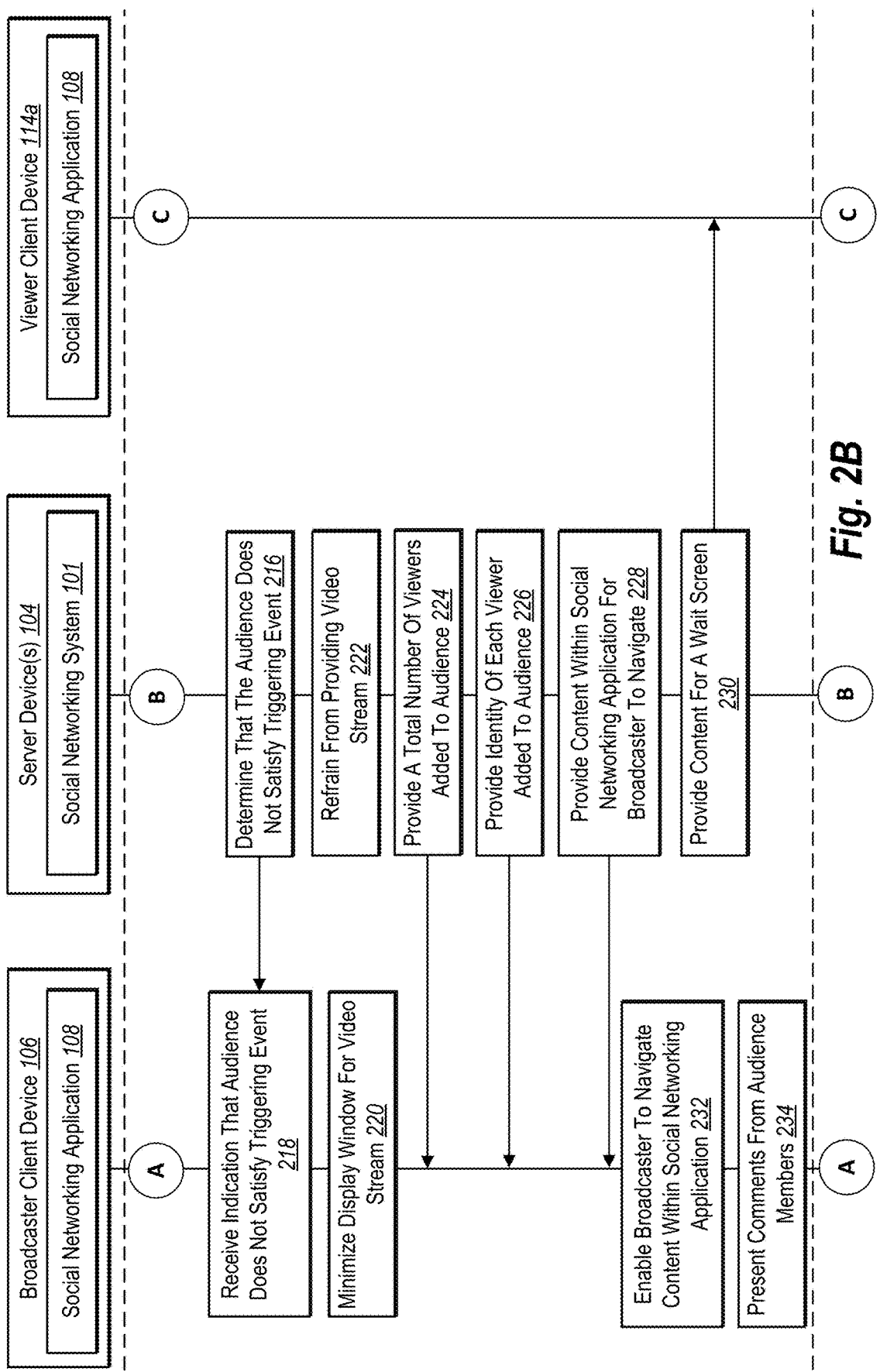

Referring now to FIGS. 2A-2C, a sequence diagram of the social networking system (e.g., social networking system 101) is shown. The sequence includes a number of acts in an example embodiment of the social networking system 101. The acts illustrated in FIGS. 2A-2B are performed, respectively, by the broadcaster client device 106, the server device(s) 104, and/or the viewer client device 114a, each executing instructions using one or more processors. As shown, FIG. 2A includes the broadcaster client device 106 and the viewer client device 114a each including a social networking application 108, and the server device(s) 104 including the social networking system 101, which can refer to the same devices, systems, and applications as discussed above with respect to FIG. 1. Although FIG. 1 depicts each viewer client device 114 including the same social networking application 108, it will be understood that, in at least one embodiment, one or more of viewer client devices 114 and/or broadcaster client device 106 may instead include a different social networking application, a messaging application, or other communications application suitable for transmitting and/or receiving live video streams.

In one or more embodiments, as illustrated in FIG. 2A, the social networking system 101 communicates with the social networking application 108 on each of the broadcaster client device 106 and the viewer client device 114a. For example, and as shown in act 200, the broadcaster client device 106 detects a selection to begin a live video broadcast. In some embodiments, the broadcast client device 106 detects the selection to begin the live video broadcast (act 200) by way of the social networking application 108. In these or other embodiments, the social networking application 108 presents, via a display on the broadcaster client device 106, a user-selectable option (e.g., a button, link, etc.) to capture and broadcast a live video stream (e.g., a "live," "go live," or "start a broadcast" button). More detail regarding the user interface of the social networking application 108 on the broadcaster client device 106 is provided below with reference to FIGS. 3, 4A-4C, and 5A-5B.

In response to the broadcaster client device 106 detecting a selection to begin a live video broadcast (e.g., act 200), the social networking system 101 at server device(s) 104 receives the request to begin the live video broadcast, illustrated by act 202. As discussed above and in more detail below with reference to FIG. 11, the social networking system 101 communicates via the server device(s) 104 and with the broadcaster client device 106 to receive various indications and requests by way of any suitable communication technology. As shown by act 202, the social networking system 101 receives the request to begin the live video broadcast detected by the broadcaster client device 106 in act 200. In one or more embodiments, the social networking system 101 receives the request in response to the broadcaster device 106 detecting a selection of a button or link to begin a live video broadcast by the broadcaster 110.

As shown in FIG. 2A, the broadcaster client device 106 transmits the video stream to the server device(s) 104, illustrated in act 204. In some embodiments, the broadcaster client device 106 transmits the video stream simultaneously or substantially simultaneously as the broadcaster client device 106 captures the video. In other words, as a capturing device (e.g., camera) associated with the broadcaster client device 106 captures video, the broadcaster client device 106 contemporaneously transmits the captured video over WIFI, cellular networks, or other network connections, to the social networking system 101 at the server device(s) 104. In other embodiments, the broadcaster client device 106 transmits the captured video as a video stream after allowing time for processing. In these or other embodiments, the broadcaster client device 106 reformats, resizes, optimizes, or otherwise processes the captured video before transmitting the video as a video stream to the social networking system 101.

As illustrated in act 206 of FIG. 2A, the social networking system 101 receives the video stream for the live video broadcast. In some embodiments, the social networking system 101 receives the video stream and processes for optimization and/or content filtering. In these or other embodiments, the social networking system 101 analyzes the video stream to ensure that the content therein is suitable for transmission as a live video broadcast to a viewing audience. Additionally or alternatively, the social networking system 101 processes the video steam to optimize (e.g., reformat, reduce in size, change in resolution, etc.) the video stream for transmission as a live video broadcast to viewer client devices (e.g., viewer client device 114a).

As further illustrated in FIG. 2A, the social networking system 101 provides a notification that the broadcaster 110 has initiated a live video broadcast, as shown in act 208. In some embodiments, the social networking system 101 provides the notification that the broadcaster 110 has initiated the live video broadcast to viewer client device 114a. In the same or other embodiments, the social networking system 101 provides the notification only upon approving the content of the video stream as appropriate for transmission and/or optimizing the content (as discussed above) to viewer client device 114a. In one or more embodiments, the notification that the broadcaster 110 has initiated a live video broadcast is an indication within the social networking application 108 on the viewer client device 114a that the broadcaster 110 is "live." More detail regarding the user interface and the appearance of the notification that the broadcaster 110 has initiated a live video broadcast as shown on viewer client device 114a is provided below with reference to FIGS. 6A-6C.

As shown by act 210 of FIG. 2A, the social networking system 101 receives, from viewer client device 114a, a request to join the audience for the live video broadcast. In some embodiments, the viewer 116a selects an option (e.g., a button or link) within the social networking application 108 on the viewer client device 114a to view the live video broadcast originating at the broadcaster client device 106. In the same or other embodiments, the option to view the live video broadcast is an indication within the social networking application 108 that the broadcaster 110 is "live," or that the broadcaster is currently broadcasting a live video stream. In these embodiments, the social networking system 101 detects the request as the viewer client device 114a notifies the social networking system 101 that the viewer 116a has selected an option to view the live video broadcast associated with the broadcaster 110. As mentioned, more detail regarding the user interface of the social networking application 108 on the viewer client device 114a is provided below with reference to FIGS. 6A-6C.

In response to receiving the request to join the audience for the live video broadcast, the social networking system 101 adds the viewer 116a to the audience for the live video broadcast, as shown by act 212 of FIG. 2A. In particular, the social networking system 101 creates an audience of viewers (e.g., viewers 116) who have requested to view the live video broadcast of the broadcaster 110. The audience includes a number of viewers who have requested to view the live video broadcast, and the audience increases in size with each new received request to view the live video broadcast. In some embodiments, the social networking system 101 adds each requesting viewer (e.g., viewer 116a) or viewer client device (e.g., viewer client device 114a) to the audience, the audience having a potentially unlimited number of viewers. In other embodiments, the audience size is capped at a maximum number of viewers that, when reached, results in the social networking system 101 refusing to add additional viewers to the audience. For viewers added to the audience, the social networking system 101 can establish one or more communication channels with client devices (e.g., viewer client device 114a) associated with the added viewers in preparation for transmitting the video stream for the live video broadcast to the users.

In the same or other embodiments, the social networking system 101 adds viewers to the audience in a number of ways. For example, in one or more embodiments where the live video broadcast has already begun (i.e., the social networking system 101 is already broadcasting the video stream received from the broadcaster client device 106 to those viewer client devices whose viewers have selected to view the live video stream), the social networking system 101 adds the viewer 116a to the audience by broadcasting the video stream to the viewer client device 114a starting at the current place in the broadcast, contemporaneous with all other viewers. In other embodiments where the live video broadcast has not yet begun, the social networking system 101 creates a virtual waiting room or virtual lobby to collect all viewers who have requested to view the live video stream. More detail regarding the virtual waiting room and its contents is provided below with reference to FIGS. 6A-6C.

As shown in FIG. 2A, the social networking system 101 determines whether the audience of viewers satisfies a triggering event, illustrated in act 214. As described above, a triggering event is an event or occurrence that, when detected, results in the social networking system 101 broadcasting the video stream received from the broadcaster client device 106 (act 206) to the viewer client device 114a. In some embodiments, determining whether the audience satisfies the triggering event includes determining whether the audience has reached a threshold size (e.g., accumulated a threshold number of viewers). The threshold number of viewers can be set by the user to as to customize the video broadcast. In other examples, the social networking system 101 can automatically set the threshold in accordance with one or more characteristics of the user (e.g., influence or number of followers), one or more characteristics of the broadcast (e.g., time of day or week, expected participation during that time, or expected content to be discussed in the broadcast based on a description received from the user), and/or one or more characteristics of past broadcasts of the user and/or other users (e.g., average viewership for the user or other users). In additional or alternative embodiments, the triggering event requires a threshold percentage of viewers (e.g., a percentage of the broadcaster's total followers, friends, or potential viewers) to be present before triggering the start of the broadcast. In other embodiments, determining whether the audience satisfies the triggering event includes determining whether the audience includes a particular person (e.g., a particular person of influence within the user's followers or friends) or a threshold level of influence (e.g., a composite level of influence among all the viewers in the audience). In still other embodiments, even if the audience does not satisfy the triggering event, the social networking system 101 can begin the broadcast based on an expiration of a timer or a selection by the broadcaster 110 to proceed with the broadcast. In yet further embodiments, the live video broadcasting system requires satisfaction of any two or more of the triggering events described herein before starting a broadcast.

In any case, when the triggering event is satisfied, the social networking system 101 performs different acts than when the triggering event is not satisfied. As illustrated in FIGS. 2B and 2C, the social networking system 101 responds to the triggering event with specific acts (shown in FIG. 2C), and the social networking system 101 responds to a determination that the triggering event has not been satisfied with different acts (shown in FIG. 2B).

Continuing the sequence flow from FIG. 2A to FIG. 2B, act 216 illustrated in FIG. 2B depicts that the social networking system 101 determines that the audience does not satisfy the triggering event (e.g., that not enough people have been added to the audience or that a particular user has not been added to the audience). As described below with reference to FIG. 4B, the social networking system 101 provides the broadcaster client device 106 with a count of the total number of viewers who have joined the audience. Additionally or alternatively, the social networking system 101 provides the broadcaster client device 106 with the name or user profile identification of each user that is added to the audience. In any event, the social networking system 101 notifies the broadcaster client device 106 that the audience does not satisfy the triggering event.

In response to the social networking system 101 determining that the audience does not satisfy the triggering event (act 216) and notifying the broadcaster client device 106 accordingly, the broadcaster client device 106 receives an indication that the audience does not satisfy the triggering event, as shown in act 218 of FIG. 2B. In some embodiments, the social networking application 108 on the broadcaster client device 106 responds to the indication that the audience does not satisfy the triggering event by providing a notification within a user interface to the broadcaster 110 that the broadcast has not begun (e.g., that the live video stream is not yet being broadcast to viewers) because the triggering event has not been satisfied. Additional detail regarding the user interface of the social networking system 101 as pertaining to the broadcaster client device 106 is provided below.

In one or more embodiments, the social networking application 108 on the broadcaster client device 106 responds to receiving the indication that the audience does not satisfy the triggering event by minimizing a display window for the video stream, as shown in act 220 of FIG. 2B. In particular, in these or other embodiments, the broadcaster client device 106 minimizes the video capturing window. The video capturing window is a window within a user interface that displays the camera feed as captured by the image capturing device (e.g., camera) of the broadcaster client device 106. In some embodiments, the video capturing window also presents information related to the broadcast of the captured video (e.g., an indication of whether the video stream is currently being broadcast, a number of viewers, etc.). As mentioned, additional detail regarding the user interface is provided below with reference to subsequent figures.

In act 220 as shown in FIG. 2B, the broadcaster client device 106 minimizes the display window by reducing the size of the display window and placing (e.g., docking) the window a corner of the display. In other embodiments, the broadcaster client device 106 minimizes the display window by collapsing the display window into a menu or border area of the display.

As shown by act 222 of FIG. 2B, the social networking system 101 refrains from providing the video stream to the viewer client device 114a in response to determining that the audience does not satisfy the triggering event (act 216). In refraining to provide the video stream, the social networking system 101 may instead notify the viewers (e.g., viewer 116a) that the broadcast has not yet begun). In some embodiments, the social networking system 101 may additionally or alternatively provide content for a wait screen or virtual lobby to the viewer client device 114a, as discussed below in act 230 of FIG. 2B.

As illustrated by act 224 of FIG. 2B, the social networking system 101 provides information to the broadcaster client device 106 such as a total number of viewers that have been added to the audience. In one or more embodiments, the total number of viewers is a running total that adjusts on the fly as additional viewers are added to the audience. In this way, the social networking system 101 provides information to the broadcaster 110 so as to enable the broadcaster 110 to gain an understanding of overall interest in the broadcaster's video broadcast.

Additionally, as illustrated by act 226 of FIG. 2B, the social networking system 101 provides the identity of each viewer that is added to the audience. In some embodiments, the social networking system 101 provides a notification each time a new viewer is added to the audience, where the notification includes a user identification or profile name of the viewer who has been added. As will be discussed in further detail below, the broadcaster client device 106 displays the name of each new viewer within a portion or segment of the display of the social networking application 108.

As further illustrated by FIG. 2B, act 228 shows that the social networking system 101 provides content within the social networking application 108 on the broadcaster client device 106 for the broadcaster 110 to navigate. In other words, after the broadcaster client device 106 minimizes the display window for the video stream (act 220), the social networking system 101 provides content for the broadcaster 110 to continue to use the social networking application 108 on the broadcaster client device 106 as normal. For example, the broadcaster 110 is able to continue navigating content within INSTAGRAM or FACEBOOK while the display window for the video stream is minimized.

Additionally, the social networking system 101 provides content for a wait screen to viewer client device 114a, as illustrated by act 230 of FIG. 2B. After the social networking system 101 determines that the audience does not satisfy the triggering event (act 216), the social networking system provides content for a wait screen to viewer client devices (e.g., viewer client device 114a). In other words, the social networking system 101 creates a virtual lobby or a virtual waiting room for viewer 116a to wait for the broadcast of the video stream to begin. Within the virtual waiting room, the social networking system 101 provides introduction content for the viewer 116a to consume while waiting for the broadcast of the video stream. In some cases, the social networking system 101 waits for a triggering event to occur before broadcasting the video stream to the viewer client device 114a (e.g., the social networking system 101 waits for a threshold number of viewers to be added to the audience). While the social networking system 101 waits for the audience to satisfy the triggering event, the social networking system 101 provides pre-show content to the viewer client device 114a such as a video, image, music, estimated wait time, comment section, etc. Content for the wait screen can include a pre-show video created by the broadcaster 110 or associated with the broadcaster 110. In this way, the social networking system 101 more effectively maintains viewers within the audience during the time before the broadcast of the video stream begins.

As shown by act 232 of FIG. 2B, the broadcaster client device 106, by way of the social networking application 108, enables the broadcaster 110 to navigate content within the social networking application 108. As mentioned, the social networking system 101 provides content within the social networking application 108 to the broadcaster client device 106 (act 228) so that the broadcaster 110 may continue to use the social networking application 108 while the display window for the video stream is minimized. Once the broadcaster client device 106 has minimized the display window for the video stream (act 220), the broadcaster client device 106 enables the broadcaster 110 to use the social networking application 108 as he or she would ordinarily do to navigate content provided by the social networking system 101 and/or to create additional content (e.g., posts, messages, images) to share through the social networking system 101.

Additionally, FIG. 2B illustrates act 234 where the broadcaster client device 106 presents comments from audience members (e.g., viewer 116a). As described above, the social networking system 101 provides content to the broadcaster client device 106 during the interim period between the initialization of the live broadcast and the start of broadcasting the live video stream to viewer client devices. As part of the content, in some embodiments, the social networking system 101 provides comments from viewers that have been added to the audience. In these or other embodiments, the viewers in the audience are waiting in the virtual lobby, whereby the viewers can post comments made viewable to the broadcaster 110 by the social networking system 101. In one or more embodiments, the comments made by viewers while waiting for the broadcast of the video stream to begin are not made viewable to other viewers, while in other embodiments the comments made by viewers are made viewable to other viewers so as to enable conversation between viewers in anticipation of the video stream. More detail regarding the comment section within the wait screen (e.g., virtual waiting room or virtual lobby) is provided below.

Continuing the sequence flow from FIG. 2B to FIG. 2C, act 236 illustrates that the social networking system 101 determines that the audience does satisfy the triggering event. In some embodiments, the social networking system 101 determines that the audience satisfies the triggering event (act 236) after first determining that the audience does not satisfy the triggering event (act 216) and waiting for a time until the audience does satisfy the triggering event, as discussed above. It will be appreciated, however, that the social networking system 101 need not determine that the audience does satisfy the triggering event (act 236) only after first determining that the audience does not satisfy the triggering event (act 216). Indeed, in some embodiments the audience may immediately satisfy the triggering event, whereupon the social networking system 101 performs the acts depicted in FIG. 2C immediately following the acts depicted in FIG. 2A (e.g., as illustrated by the "A," "B," and "C" links in the figures). Contrariwise, in other embodiments, the social networking system 101 performs the acts of FIG. 2A followed by the acts of FIG. 2B and then the acts of FIG. 2C, again following an alternate path of the "A," "B," and "C" links therein.

In response to the social networking system 101 determining that the audience satisfies the triggering event (act 236), the broadcaster client device 106 receives an indication that the audience satisfies the triggering, as illustrated by act 238 of FIG. 2C. In particular, the broadcaster client device 106 receives an indication sent by the social networking system 101 that prompts the broadcaster client device 106 to prepare for the beginning of the broadcast and/or to perform certain acts in response to the audience satisfying the triggering event.

For example, as shown in act 240 of FIG. 2C, the broadcaster client device 106 maximizes the display window for the video stream in response to receiving the indication the audience satisfies the triggering event (act 238). In some embodiments, the broadcaster client device 106 maximizes the display window for the video stream by expanding the size of the display window associated with the camera feed to take up the entirety of the display area on the broadcaster client device 106. In other embodiments, the broadcaster client device 106 maximizes the display window by expanding the display window to a size less than the entire display area but more than a minimized screen area. In the same or alternative embodiments, the broadcaster client device 106 maximizes the display window by bringing the display window to the foreground of the social networking application 108 presented on the display of the broadcaster client device 106. In any case, the broadcaster client device 106 makes the display window of the video stream the predominant viewing portion within the display of the broadcaster client device 106.

As further shown in FIG. 2C, the social networking system 101 provides or otherwise triggers a countdown to begin broadcasting the video stream, illustrated by act 242. The social networking system 101 provides, to both the broadcaster client device 106 and the viewer client device 114a, and in response to determining that the audience satisfies the triggering event (act 236), a countdown or timer that signals the final moments before the broadcast of the live video stream begins. In some embodiments, the social networking system 101 provides the countdown in the form of a ticker that counts down the seconds until the broadcast of the video stream begins (e.g., "3-2-1"). More detail is provided hereafter regarding the appearance of the countdown in the user interface of the broadcaster client device 106 and/or the viewer client device 114a. In any event, the social networking system 101 signals the beginning of the broadcast of the video stream to both the broadcaster client device 106 and the viewer client device 114a in response to the audience satisfying the triggering event.

As shown by act 244 of FIG. 2C, the broadcaster client device presents comments from audience members. Similar to act 234 described above with reference to FIG. 2B, the broadcaster client device 106 provides a comments section within the display wherein the broadcaster client device 106 further presents comments submitted by viewers in the audience. While FIG. 2C shows that the broadcaster client device presents comments from audience members as act 244 after the social networking system 101 provides a countdown to begin broadcasting the video stream (act 242), and before the broadcaster client device presents the countdown to begin broadcasting (act 246), it will be appreciated that the broadcaster client device 106 may present comments from audience members throughout (e.g., at any time within) the sequence of acts illustrated in FIG. 2C. In other words, the broadcaster client device 106 need not wait for the social networking system 101 to provide a countdown before presenting audience comments, and need not be limited to only presenting comments before presenting the countdown within a display of the broadcaster client device 106. Furthermore, at any point before or after the beginning of the broadcast, the broadcaster can turn off or disable comments for all or one or more of the viewers in the audience.

As further illustrated by FIG. 2C, act 246 shows that the broadcaster client device 106 presents a countdown to begin broadcasting the video stream. Once the social networking system 101 provides the countdown (act 242) to the broadcaster client device 106, the broadcaster client device 106 responds by presenting (e.g., displaying) the countdown in the form of an animation or visual effect (e.g., an animated "3-2-1" countdown) to illustrated to the broadcaster 110 that the video currently being captured by the broadcaster client device 106 is going to be broadcast "live" (e.g., in real-time or near real-time) to the audience of viewers.

Though not illustrated in FIG. 2C, in at least one embodiment, the sequence of acts may be performed in a different order. For example, in some embodiments, the broadcaster client device 106 transmits the video stream (as in act 204) after the broadcaster client device 106 presents the countdown to begin broadcasting the video stream (act 246). In these embodiments, the broadcaster client device 106 performs acts 218, 220, 232, 234, 238, 240, 244, and 246 before transmitting the video stream (act 204). Accordingly, the broadcaster client device 106 presents the countdown to begin broadcasting (act 246), and the broadcaster client device subsequently transmits the video stream (act 204) to the social networking system 101. Thus, the social networking system 101 receives the video stream for the live video broadcast (act 206) and continues to perform subsequent acts (e.g., acts 208, 210, 212, etc.) as shown in FIGS. 2A-2C. Likewise, other acts illustrated in FIGS. 2A-2C may be performed in an alternative order, according to one or more embodiments.

As used herein, broadcasting the video stream is defined as transmitting the video stream captured by the broadcaster client device 106 across a network (e.g., network 112) to the social networking system 101 at server device(s) 104, whereupon the social networking system 101 then retransmits the video stream (as discussed above) to the viewer client device 114a for viewing by the viewer 116a.

Still further shown by act 248 in FIG. 2C, the social networking system 101 provides, to both the broadcaster client device 106 as well as the viewer client device 114a, a notification that a live broadcast of the video stream has begun. In some embodiments, the social networking system 101 prompts the broadcaster client device 106 to present a message to the broadcaster 110 that the live broadcast has begun (e.g., "you are now live" or "streaming live"). In additional or alternative embodiments, the social networking system 101 also prompts the viewer client device 114a to present a notification or message to viewer 116a that the live broadcast has begun (e.g. "broadcaster 110 is live" or "now viewing live"). In these embodiments, the social networking system 101 provides the notification that the live broadcast has begun by signaling to the broadcaster client device 106 that the social networking system 101 is going to begin transmitting the video stream received from the broadcaster client device 106 (act 206) to the viewer client device 114a. Additionally, the social networking system 101 similarly signals to the viewer client device 114a.

As shown by act 250 of FIG. 2C, the social networking system 101 broadcasts the video stream to the viewer client device 114a. As mentioned, the social networking system 101 transmits the video stream that originated at the broadcaster client device 106 (e.g., the video captured by the broadcaster client device 106) as a "live" broadcast to the viewer client device 114a. In this way, the viewer 116a, by way of viewer client device 114a, sees a real-time or near real-time representation of the camera feed of the broadcaster client device 106 as video is captured by the broadcaster client device 106.

In particular, the social networking system 101 transmits the video stream received from the broadcaster client device 106 in response to the broadcaster 110 selecting to broadcast the video stream. In some embodiments, the social networking system 101 provides the video stream by communicating with the social networking application 108 on the viewer client device 114a (e.g., via network 112) and causing the social networking application 108 to present the video stream to the viewer 116a.

Figure 3:
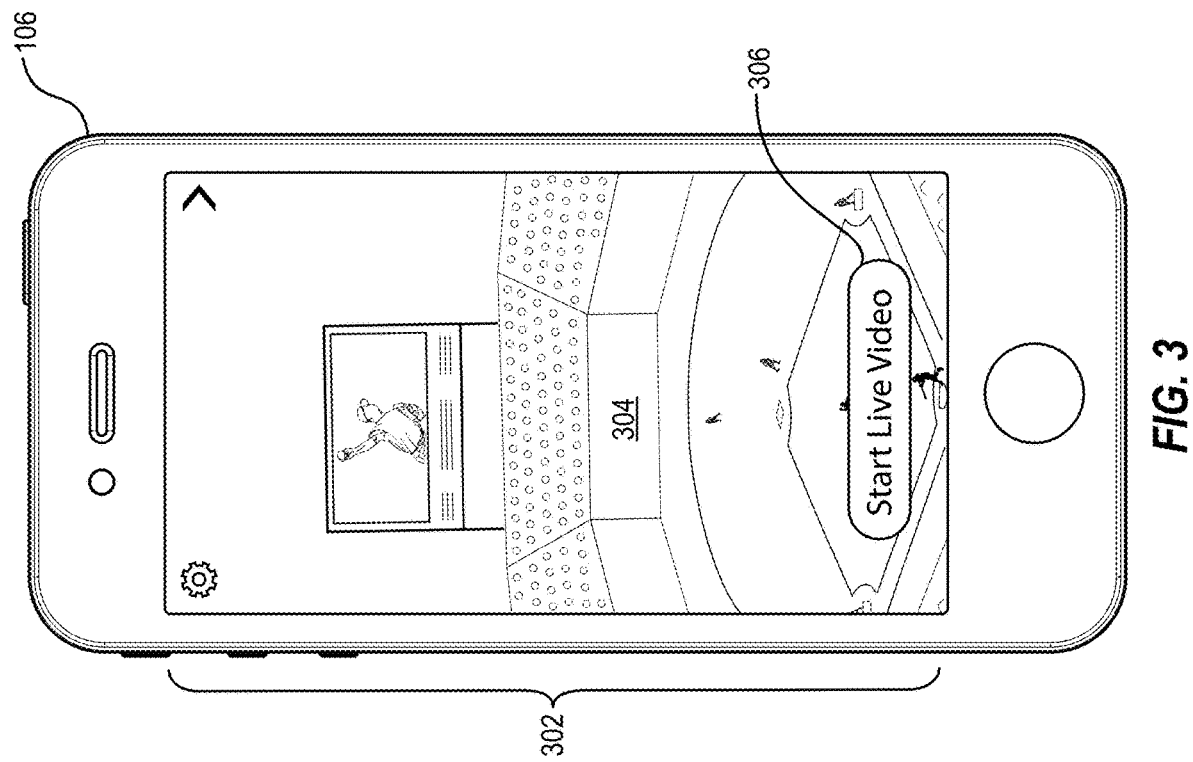
FIG. 3 illustrates a graphical user interface for initializing a live video broadcast in accordance with one or more embodiments.

FIG. 3 illustrates an example graphical user interface (GUI) on the broadcaster client device 106. In particular, FIG. 3 illustrates that the broadcaster client device 106 includes a broadcaster display interface 302 that presents a camera feed 304 along with an option to begin broadcasting a video stream 306. For example, FIG. 3 illustrates a GUI on the broadcaster client device 106 before a live video stream presentation (e.g., the broadcaster client device 106 has not yet initiated a broadcast of a video stream).

As used herein, the camera feed 304 (or video capturing feed) includes video content that the broadcaster client device 106 is capturing and providing to the social networking system 101. In one or more embodiments, the camera feed includes video content that the broadcaster client device 106 is currently capturing using a camera on the broadcaster client device 106. Accordingly, in some examples, the camera feed 304 depicts the video stream on the broadcaster client device 106 as the social networking system 101 receives the video stream and transmits the video stream to an audience (e.g., viewer client devices 114).

As briefly mentioned above, FIG. 3 shows that the broadcaster client device 106 causes the broadcaster display interface 302 to present the camera feed 304 and the option to begin broadcasting a video stream 306. The option to begin broadcasting a video stream 306, for example, can be a button or link whose selection indicates to the broadcaster client device 106 to begin broadcasting the video feed 304 to the social networking system 101. In some embodiments, the option to begin broadcasting a video stream 306 is overlaid on the camera feed 304. In these embodiments, the option to begin broadcasting a video stream 306 remains separate from the camera feed 304 and may be manipulated, changed, or modified (e.g., by the viewer broadcaster client device 106 or the social networking system 101) independently from the camera feed 304.

In other embodiments, the option to begin broadcasting a video stream 306 is integrated into the display of the camera feed 304. In these embodiments, the option to begin broadcasting a video stream 306 is embedded as a part of the presentation of the camera feed 304 on the broadcaster display interface 302. In these embodiments, the option to begin broadcasting a video stream 306 is fixed as determined by the social networking application 108.

Figure 4B:
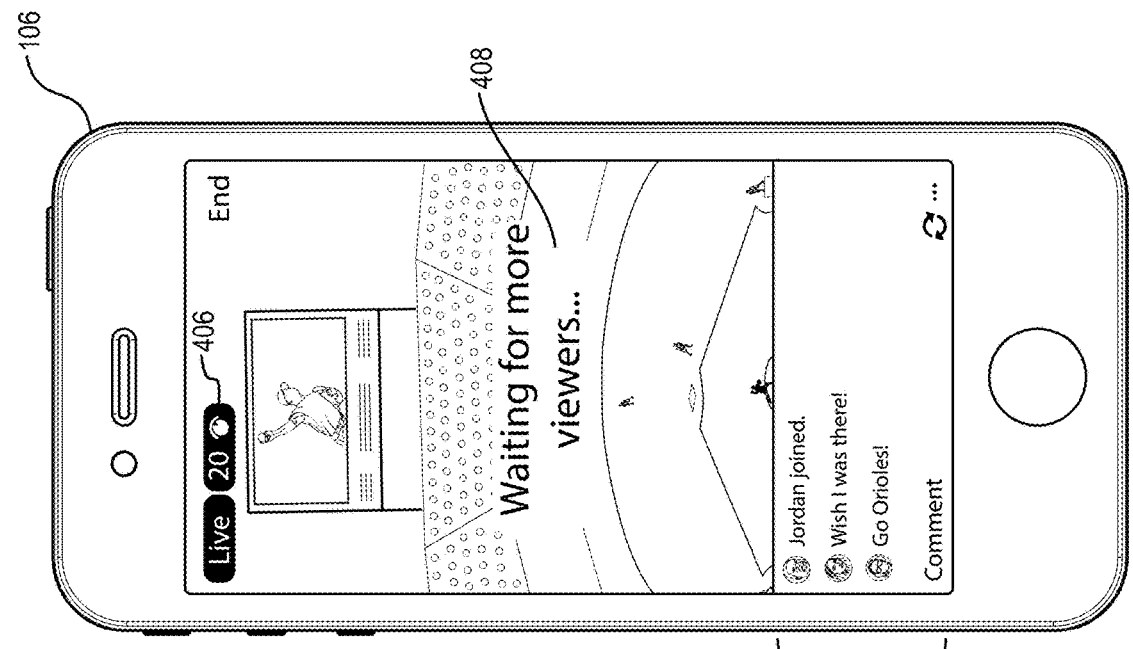
FIGS. 4A-4C illustrate a series of graphical user interfaces for providing content to a broadcaster client device in accordance with one or more embodiments.
Figure 4A:
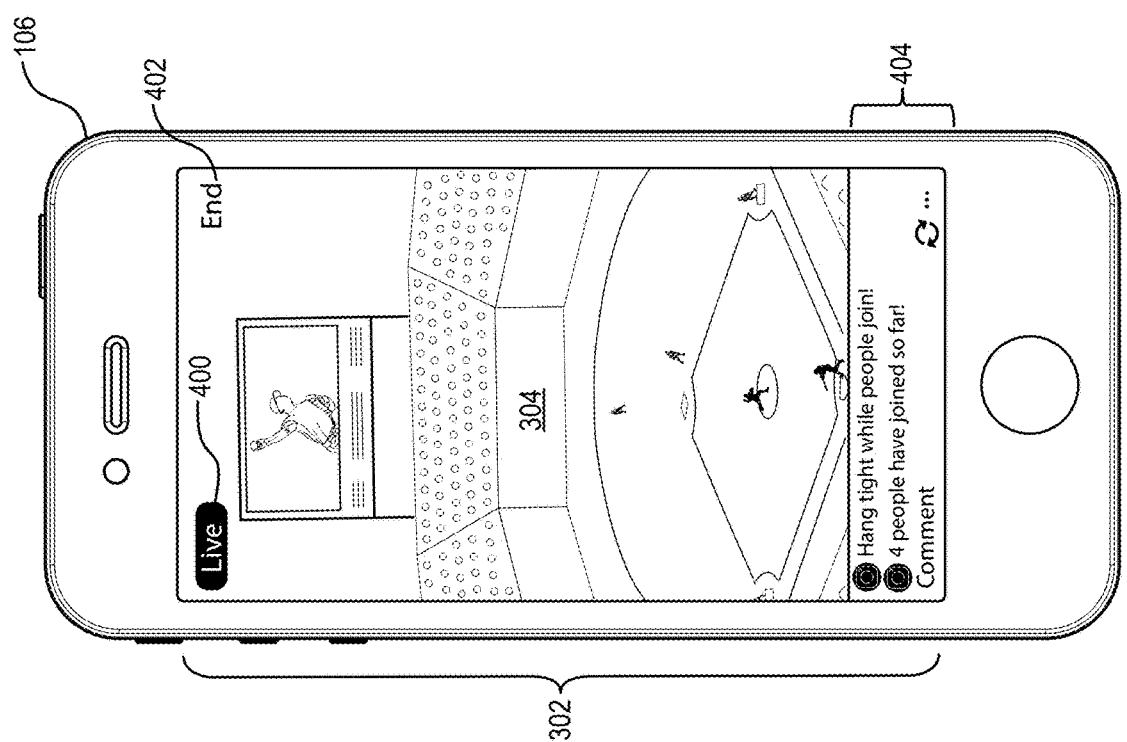
Figure 4C:
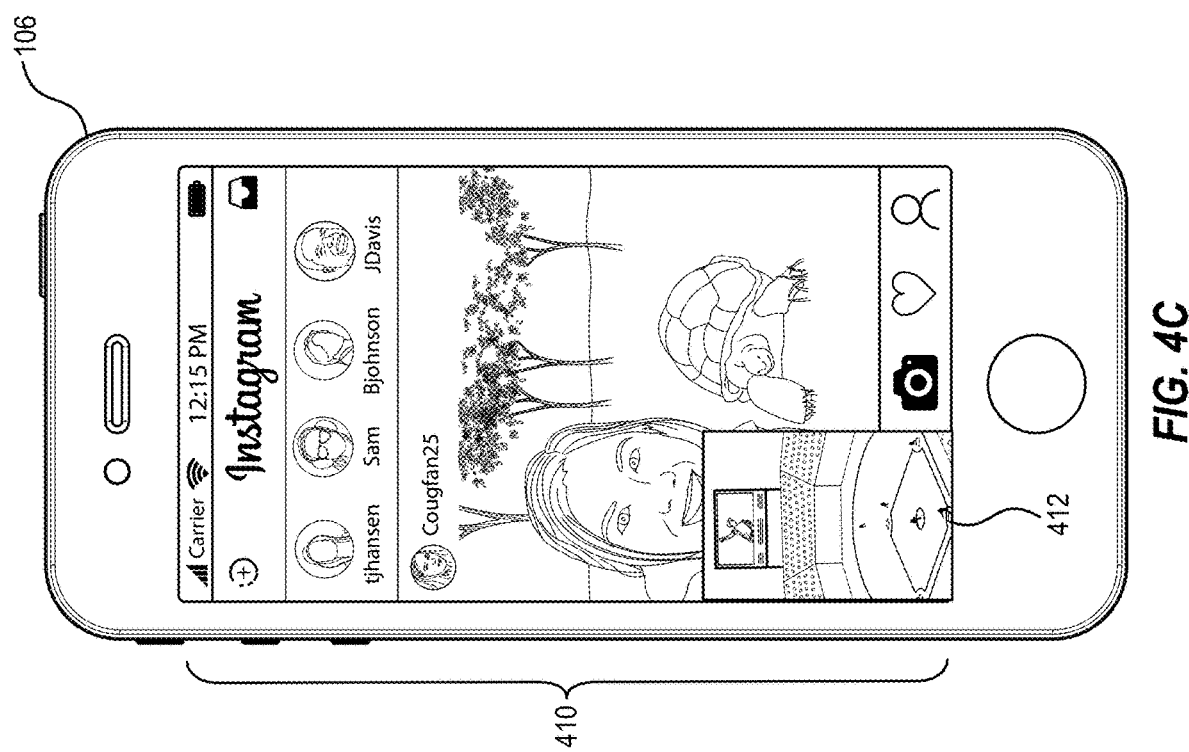

FIGS. 4A-4C illustrate a series of GUIs relating to what is shown on the broadcaster client device 106 when the audience does not satisfy the triggering event. As shown in FIGS. 4A-4C, the presentation on the broadcaster display interface 302 includes various interactive elements. For example, the interactive elements may include buttons, links, widgets, or other user-selectable options presented on the broadcaster client device 106. It will be appreciated that, in some embodiments FIGS. 4A-4C are a progression of GUIs as shown on the broadcaster client device 106 throughout the process of triggering a live video broadcast. In particular, as shown in FIG. 4A, the broadcaster display interface 302 presents, in conjunction with the camera feed 304, a status indicator 400, a termination option 402, and a dialogue section 404. As mentioned above, the broadcaster 110 may select the option to begin broadcasting a video stream 306 from within the presentation on the broadcaster display interface 302 (e.g., by a touch input, a voice input, a click input, etc.). Additionally, upon detecting the selection of the option to begin broadcasting a video stream 306, the social networking application 108 presents a new GUI (e.g., as shown by FIG. 4A) by changing the presentation on the broadcaster display interface 302 to begin informing the broadcaster 110 on the progress being made in gathering an audience sufficient to satisfy the triggering event to cause the social networking system 101 to broadcast (e.g., transmit) the camera feed 304 to the audience of viewer client devices (e.g., viewer client device 114a).

As mentioned, FIG. 4A illustrates a status indicator 400. As shown, the status indicator provides a status of the broadcast. In particular, the status indicator 400 informs the broadcaster 110 as to whether the broadcaster 110 is currently broadcasting or not (e.g., whether the broadcaster 110 is "live"). It will be appreciated that, while the status indicator 400 as shown in FIG. 4A indicates that the broadcaster 110 is currently "live" (e.g., that the broadcaster client device 106 has initiated a broadcast of a video stream), the social networking system 101 has not yet begun transmitting the video stream (e.g., camera feed 304) to the audience of viewer client devices. Rather, the status indicator 400 indicates that the broadcaster client device 106 is currently transmitting (e.g., broadcasting) the camera feed 304 to the social networking system 101 as described above, but since the triggering event has not yet been satisfied as illustrated in FIG. 4A, the social networking system 101 has not, therefore, relayed the transmission of the camera feed 304 to the audience of viewer client devices.

As further illustrated in FIG. 4A, the broadcaster display interface 302 includes termination option 402. The termination option 402 is a user-selectable option whereby the broadcaster 110, upon selecting the termination option 402, can choose to end the live broadcast at any time. Upon detecting selection of the termination option 402, the broadcaster client device 106 stops transmitting the camera feed 304 to the social networking system 101 and ends the live broadcast. Additionally, the broadcaster client device 106 provides a notification to the social networking system 101 that the broadcaster 110 has selected the termination option 402, whereupon the social networking system 101 provides a similar notification to the viewer client device 114a and ceases to transmit the video stream to the viewer client device 114a.

Also shown in FIG. 4A, broadcaster display interface 302 further includes a dialogue section 404. In some embodiments, the dialogue section 404 displays information relating to the live broadcast to the broadcaster 110. For example, in these or other embodiments the dialogue section 404 presents messages about the triggering event. For instance, as shown in FIG. 4A the dialogue section 404 displays messages such as, "Hang tight while people join!" to indicate that the social networking system 101 is waiting for more viewers to join (e.g., to be added to the audience) before broadcasting the video stream (e.g., camera feed 304) to the viewer client devices 114. Additionally or alternatively, the dialogue section 404 displays messages such as, "4 people have joined so far" to indicate to the broadcaster 110 a number of viewers that have been added to the audience. As described above, in some embodiments the social networking system 101 waits for a threshold number of viewers to be added to the audience to determine that the triggering event is satisfied before broadcasting the video stream to the viewer client devices 114.

As shown in FIG. 4B, the broadcaster display interface 302 includes an audience size indicator 406 and a status message 408 in conjunction with the camera feed 304 and dialogue section 404. In particular, the audience size indicator 406 presents information to the broadcaster 110 relating to the size of the audience (e.g., how many viewers have been added to the audience at any given point). The audience size indicator 406 adjusts with each addition of a new viewer to the audience, always reflecting the total number of viewers in the audience. As shown in FIG. 4B the audience has 20 total viewers as indicated by the audience size indicator 406.

As further shown in FIG. 4B, the audience of 20 viewers is not enough to satisfy the triggering event as depicted. As indicated by the status message 408 in the embodiment shown in FIG. 4B, the social networking system 101 is still waiting for more viewers before beginning the broadcast of the video stream to viewer client devices 114. The status message 408 can reflect the status of the triggering event and/or audience status to inform the broadcaster 110 as to whether or not the triggering has been satisfied. In one or more embodiments, the broadcaster display interface 302 displays the status message 408 as an overlay on top of the camera feed 304, while in other embodiments the broadcaster display interface 302 displays the status message 408 within the dialogue section 404 so as not obfuscate the presentation of the camera feed 304.

Looking to FIG. 4C, the broadcaster client device 106 displays a broadcaster application interface 410. In response to the broadcaster client device 106 receiving an indication that the audience has not satisfied the triggering event (discussed above), the broadcaster display interface 302 is minimized into the broadcast window 412. In some embodiments, the broadcaster display interface 302 is minimized including each feature therein (e.g., dialogue section 404, the audience size indicator 406, and/or the status message 408), while in other embodiments the broadcaster display interface 302 is minimized without displaying the other features therein. In these embodiments, the broadcaster display interface 302 displays less than all of the features shown in FIGS. 4A and 4B, such as the camera feed 304, for example.

As shown in FIG. 4C, the broadcaster client device 106 enables the broadcaster 110 to navigate through the social networking application 108 while the live broadcast is ongoing. As shown in FIG. 4C, for example, the broadcaster client device 106 transmits the video stream (e.g., camera feed 304) to the social networking system 101 while also displaying the broadcaster application interface 410. However, the audience has not yet satisfied the triggering event, and the social networking system 101 therefore provides application content to the broadcaster client device 106 associated with the social networking application 108 and minimizes the broadcaster display interface 302 into the broadcast window 412. By receiving the application content provided by the social networking system 101, the broadcaster client device 106 thereby enables the broadcaster 110 to use the social networking application 108 with normal functionality. While the broadcaster display interface 302 is minimized into the broadcast window 412 within the broadcaster application interface 410, the broadcaster 110 is thereby able to use the social networking application 108 while he or she waits for the audience to satisfy the triggering event (thus resulting in the video stream to begin for the audience).

As discussed above, when the social networking system 101 determines that the audience satisfies the triggering event and notifies the broadcaster client device 106 accordingly, then the broadcaster client device 106 maximizes the broadcast window 412 within the display. In these embodiments, the broadcaster client device expands the broadcast window 412 to take up the display area previously used by the broadcaster application interface 410, to again look like the broadcaster display interface 302 as shown in FIG. 5A.

Figure 5B:
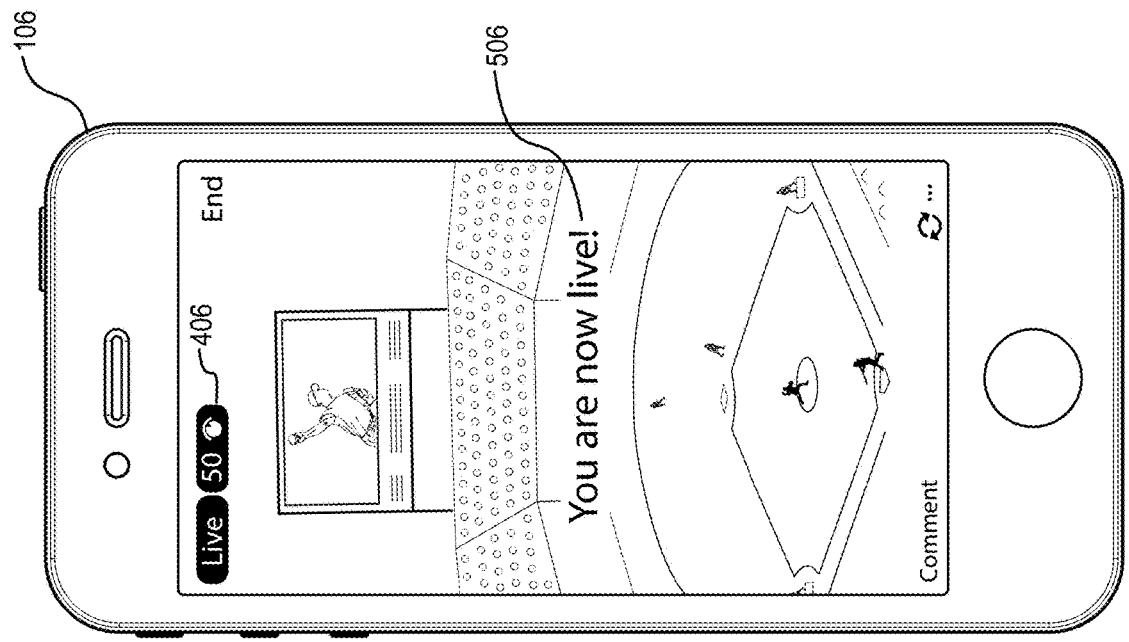
FIGS. 5A-5B illustrate a series of graphical user interfaces for starting a live video broadcast accordance with one or more embodiments.
Figure 5A:
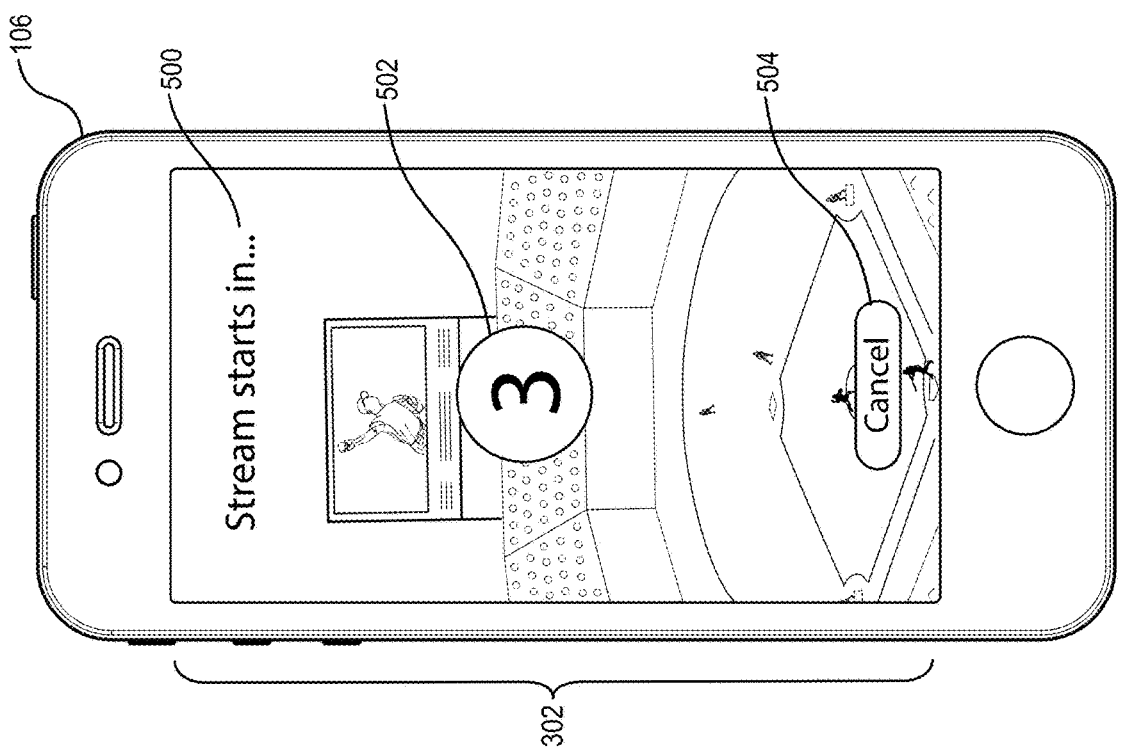

FIGS. 5A-5B illustrate a series of GUIs depicting the broadcaster client device 106 when the audience does satisfy the triggering event. As shown in FIG. 5A, the broadcaster display interface 302 is maximized from the broadcast window 412 of FIG. 4C. In addition, the broadcaster display interface 302 includes a start indicator 500, a countdown indicator 502, and a cancel option 504. The display interface also includes the camera feed 304 as shown in FIG. 4A that is to be broadcast as the video stream provided to the social networking system 101 and then to the viewer client device 114a.

As shown in FIG. 5A, the social networking system 101 determines that the audience has satisfied the triggering event and provides a resultant notification to the broadcaster client device 106 accordingly. In response, the broadcaster client device 106 shown in FIG. 5A maximizes the broadcaster display interface 302 (e.g., expands the broadcast window 412 of FIG. 4C into the broadcaster display interface 302) and presents, within the broadcaster display interface 302, a start indicator 500 to the broadcaster 110. The start indicator 500 notifies the broadcaster 110 that the audience has satisfied the triggering and that, consequently, the video stream is about to begin broadcasting to the audience of viewers by way of the viewer client devices 114.

In addition to the start indicator 500, the broadcaster display interface 302 further includes a countdown indicator 502. In one or more embodiments, the countdown indicator 502 displays a series of decrementing numbers as the broadcast of the video stream is about to begin. In the same or different embodiments, the series of numbers reflect the seconds (or other amount of time) remaining until the social networking system 101 begins transmitting the video stream received from the broadcaster client device 106 to the viewer client device 114a. In other embodiments, the series of numbers displayed within the countdown indicator 502 increments rather than decrements. In still other embodiments, the countdown indicator 502 is a series of characters displaying a message that the video stream is about to begin, such as "Going live now," or "Setting up your broadcast."

Further illustrated by FIG. 5A, the broadcaster display interface 302 includes a cancel option 504. As shown, the cancel option 504 is selectable at any time by the broadcaster 110 to terminate the broadcast of the video stream. Upon detecting selection by the broadcaster 110 of the cancel option 504, the broadcaster client device 106 stops transmitting the video stream captured by the broadcaster client device 106 to the social networking system 101.

As shown in FIG. 5B, the broadcaster display interface 302 includes the audience size indicator 406 described above as well as the dialogue section and a live indicator 506. In particular, the live indicator 506 presents a message to the broadcaster 110 that the social networking system 101 has started broadcasting the video stream provided by the broadcaster client device 106 to the viewer client device 114a. As such, viewer 116a can then view the camera feed 304 as a video stream on viewer client device 114a as shown in FIG. 6C and described below.

Figure 6C:
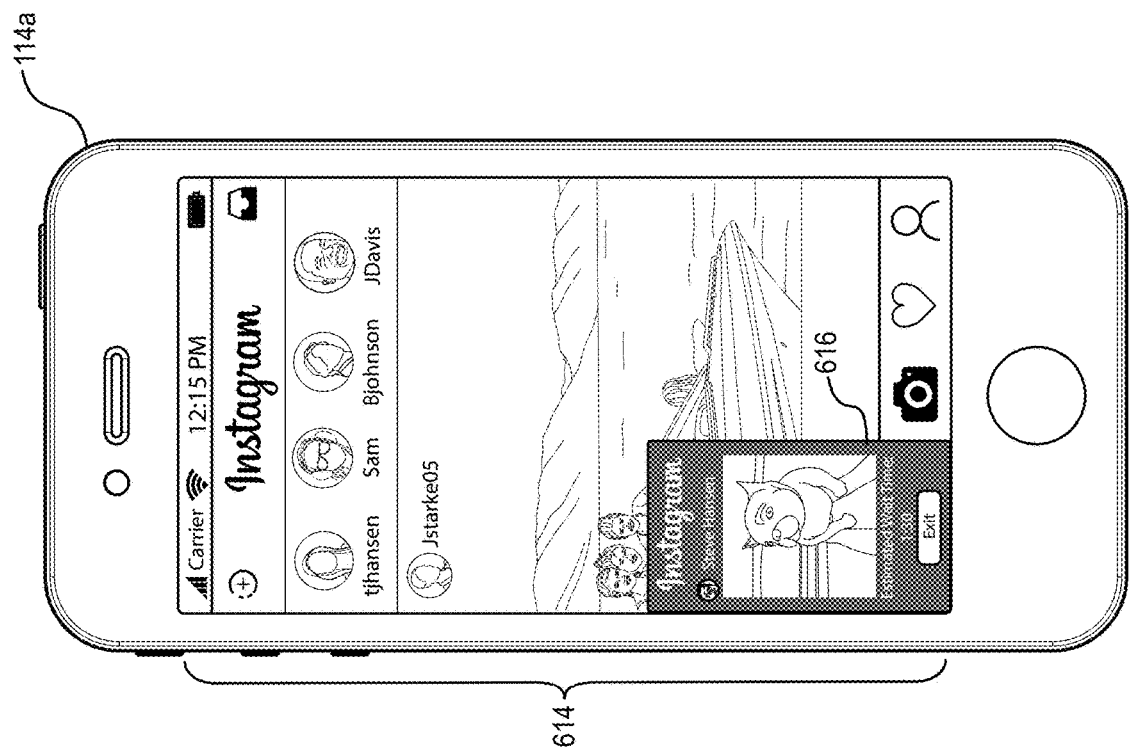

FIGS. 6A-6C illustrate a series of GUIs on the viewer client device 114a relating to the broadcast of the video stream. Changing perspective from the broadcaster client device 106 to the viewer client device 114a and looking to FIG. 6A, the viewer client device 114a presenting a viewer display interface 602 is shown. As illustrated in FIG. 6A, the viewer display interface 602 includes various elements, features, and options. For example, the viewer display interface 602 includes broadcaster indicator 604 and a wait message 606, which in some embodiments includes therein the broadcaster indicator 604. In addition, the viewer display interface 602 also includes a wait time indicator 608 and an exit option 610.

As mentioned, and as illustrated in FIG. 6A, the viewer display interface 602 includes a broadcaster indicator 604. In some embodiments, the broadcaster indicator 604 is an image, profile photo, or other pictographic representation of the broadcaster 110 whose live broadcast the viewer 116a has selected to view. In additional or alternative embodiments, the broadcaster indicator 604 is the broadcaster's name or other identifier. In any case, the social networking system 101 provides a broadcaster indicator 604 in one for or another to provide identification of the broadcaster 110.

In conjunction with the broadcaster indicator 604, the viewer display interface 602 includes a wait message 606, as further shown in FIG. 6A. In some embodiments, the wait message 606 displays text such as, for example, "Steve's broadcast will begin shortly" to indicate to the viewer 116a that the social networking system 101 has not yet started broadcasting the video stream originating at the broadcaster client device 106. The wait message 606 further indicates to the viewer 116a, by way of viewer client device 114a, that the viewer 116a is indeed waiting for the correct broadcast to begin and that the viewer 116a has successfully been added to the audience for the live broadcast.

Furthermore, as shown in FIG. 6A, the viewer display interface 602 includes a wait time indicator 608. In particular, the wait time indicator 608 displays a timer (e.g., a countdown timer) indicating how much time is remaining until the broadcast of the live video stream begins. For example, in some embodiments the wait time indicator 608 displays "3:00" indicating that three minutes are remaining until the start of the live broadcast. In these or other embodiments, the timer decreases to zero as the start of the broadcast approaches. It will be appreciated that, in some embodiments, the wait time indicator 608 displays an estimated remaining time. In these or other embodiments, the social networking system 101 calculates an estimated remaining time based on a number of factors including, but not limited to, the number of viewers required to satisfy the triggering event, the rate at which viewers are added to the audience, the popularity of previous live broadcasts put on by the broadcaster 110, the average time it takes to gather an audience, etc. The social networking system 101 provides the estimated remaining time to the broadcaster client device 106 which then presents the time within the viewer display interface 602, as shown in FIG. 6A.

The exit option 610, as also shown in FIG. 6A, is user-selectable and causes the viewer client device 114a to leave the audience for the live broadcast. In other words, once the viewer 116a selects the exit option 610, the viewer client device 114a sends a notification to the social networking system 101 that the viewer client device 114a associated with viewer 116a is to be removed from the audience. In response to receiving the notification, the social networking system 101 removes the viewer client device 114a from the audience for the live video broadcast.

As illustrated in FIG. 6B, in some embodiments the viewer display interface 602 includes, addition to the wait time indicator 608 and exit option 610 discussed above, wait screen content 612. In particular, the social networking system 101 provides, from a portion of a database associated with the broadcaster 110 (e.g., previously uploaded by the broadcaster 110), wait screen content 612 to the viewer client device 114a. The social networking system 101 provides the wait screen content 612 after adding the viewer client device 114a to the audience and determining that the audience does not yet satisfy the triggering event. In these embodiments, the social networking system 101 provides the wait screen content 612 as a precursor or introduction to the live broadcast associated with the broadcaster 110. In this way, the viewer 116a can view the wait screen content 612 as he or she waits for the live broadcast to begin (e.g., for the audience to satisfy the triggering event). Thus, the social networking system 101 creates a sort of virtual lobby or virtual waiting room for the viewer 116a, as well as for viewers 116b-116n. Indeed, in some embodiments the social networking system 101 provides the same wait screen content 612 to each of viewer client devices 114, while in other embodiments the social networking system 101 provides different wait screen content 612 to one or more of the viewer client devices 114 such that not all viewers 116 experience the same virtual lobby.

For instance, in one or more embodiments the social networking system 101 provides wait screen content 612 that is related to or created by the broadcaster 110. In at least one embodiment, the wait screen content 612 is related to the live video broadcast. In at least one other embodiment, the wait screen content 612 is related to the broadcaster 110 and introduces the viewer 116a to the broadcaster 110. In these or other embodiments, the wait screen content advertises a broadcast channel associated with the broadcaster 110 or other related content such as channels and/or videos of other broadcasters similar to broadcaster 110.

In at least one embodiment, the wait screen content 612 is a pre-show video. In other embodiments, the wait screen content 612 is an image, audio clip, music, advertisement, GIF, or other digital media content item. The social networking system 101 provides the wait screen content 612 until the audience satisfies the triggering event, at which time, the social networking system 101 notifies the viewer client device 114a that the broadcast of the video stream is about to start. In response, the viewer client device 114a may display a countdown or other start screen within the viewer display interface 602 similar to the countdown presented within the broadcaster display interface 302 shown in FIG. 5A.

Looking to FIG. 6C, the viewer client device 114a displays the viewer application interface 614 including viewer window 616. Similar to the discussion above regarding the broadcast window 412 of FIG. 4C, the viewer window 616 of FIG. 6C is a minimized display of the viewer display interface 602 described above. As shown, the social networking system 101 determines that the audience does not satisfy the triggering event, whereupon the viewer client device 114a minimizes the viewer display interface 602 into the viewer window 616. The viewer client device 114a minimizes the viewer display interface 602 into the viewer window 616 by shrinking the size of the viewer display window 602 so as to enable the viewer 116a to navigate other content.

For example, in at least one embodiment, the social networking system 101 provides content associated with the social networking application 108 to the viewer client device 114a. In this way, the social networking system 101 enables the viewer 116a to use the social networking application 108 on the viewer client device 114a while the viewer window 616 is displayed in a corner. The viewer 116a may then navigate the social networking application 108 while he or she waits for the audience to satisfy the triggering event. When the social networking system 101 determines that the audiences does satisfy the triggering event, the social networking system 101 provides a corresponding notification to the viewer client device 114a. In response, the viewer client device 114a maximizes the viewer window 616 back into the viewer display interface 602 to display the video stream provided by the social networking system 101.

Additionally, in one or more embodiments the social networking system 101 provides comments to the viewer client device 114a. As discussed above, in some embodiments only the broadcaster client device 106 has a dialogue section (e.g., dialogue section 404) to display viewer comments. In other embodiments, however, the viewer client device 114a may also have a dialogue section to display comments from other viewers as well as messages from the social networking system 101 and/or the broadcaster 110.

Figure 7:
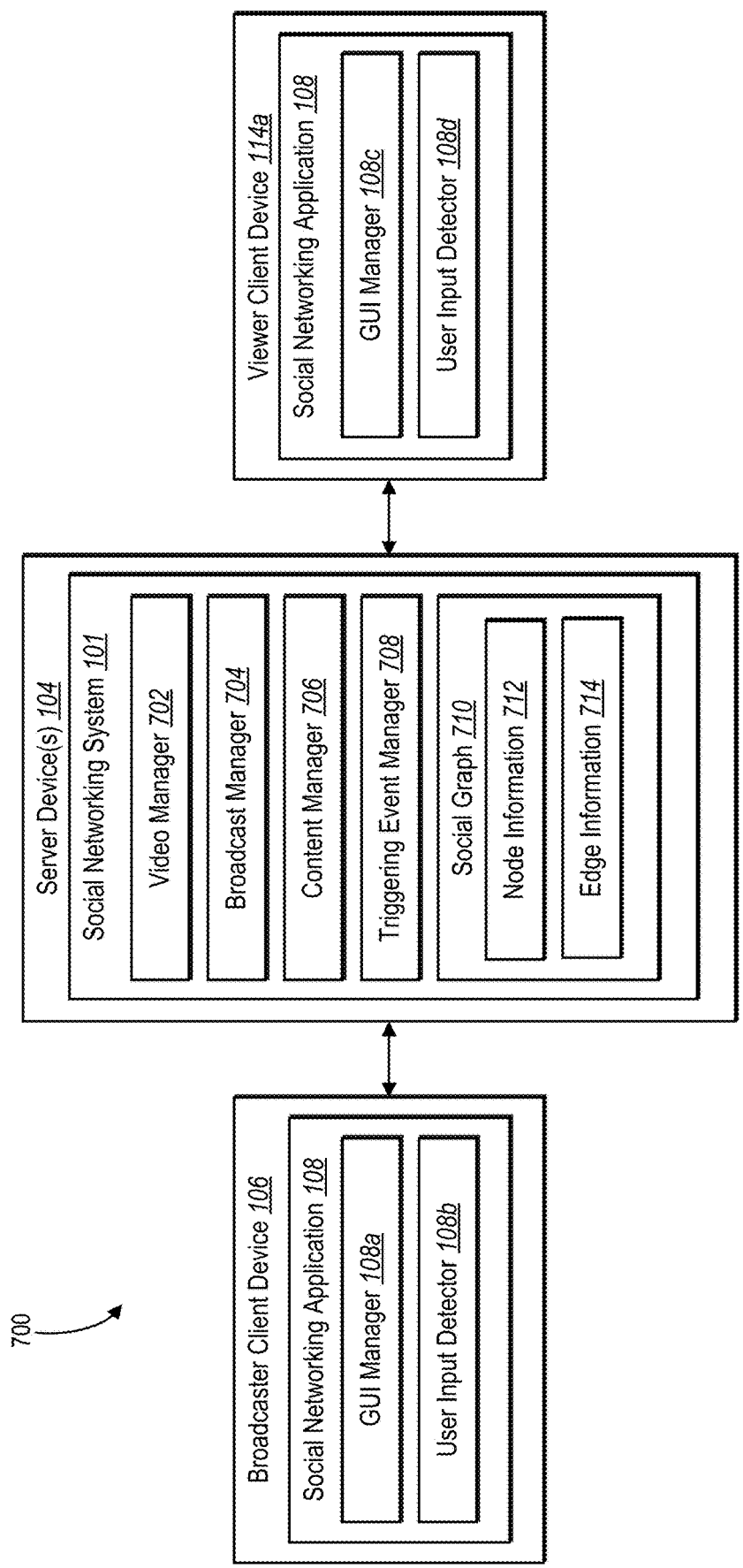
FIG. 7 illustrates a schematic diagram of a live video broadcast system in accordance with one or more embodiments.

FIG. 7 illustrates a schematic diagram 700 of an example live video broadcast system including a social networking system 101 housed on server device(s) 104 as well as the social networking application 108 housed on both the broadcaster client device 106 and the viewer client device 114a. The social networking system 101 can be an example embodiment of the social networking system as described above. Further, the social networking system 101 can be executed on a video capturing system, a video broadcasting system, and/or a social networking system, such as the social networking system described with respect to FIGS. 11-12.

As shown in FIG. 7, the social networking application 108 on the broadcaster client device 106 can include various components such as the GUI manager 108a and the user input detector 108b. From the perspective of the broadcaster client device 106, the GUI manager 108a may manage, provide, display, animate, or otherwise present GUIs on the broadcaster client device 106. In particular, the GUI manager 108a may interact with the user input detector 108b to alter its appearance in response to detecting user input by the broadcaster 110. In some embodiments, as described above, the GUI manager 108a displays the broadcaster display interface 302 together with the camera feed 304 and the other options and features described above. Upon the user input detector 108b detecting user input (e.g., a touch input to start a live broadcast), the GUI manager 108a may display a GUI to present the broadcaster 110 with options corresponding to the detected input.

For example, in response to the user input detector 108b detecting user input by the broadcaster 110 in the form of touch input or typing input to begin broadcasting a video stream, the GUI manager 108a displays, within a GUI of the social networking application 108, the camera feed 304, the dialogue section 404, and the other features described above. In response to the social networking system 101 determining that the audience does not satisfy the triggering event, the GUI manager 108a may display a wait message and audience size indicator. Furthermore, the GUI manager 108a may minimize the broadcaster display interface 302 so as to preserve display space for the broadcaster to navigate other content. For example, the GUI manager 108a may also display social networking application content while waiting for the audience to satisfy the triggering event, as described above. Additionally, the GUI manager 108a may maximize the broadcaster display interface 302 once the audience satisfies the triggering event. Each of the interfaces displayed by the GUI manager 108a on the broadcaster client device 106 may be part of the interfaces describe above.

From the perspective of the viewer client device 114a, the GUI manager 108c may manage, display, animate, or otherwise present GUIs on the viewer client device 114a. In particular, the GUI manager 108c may display the video stream that is captured by the broadcaster client device 106 and provided by the social networking system 101. Where the audience does not satisfy the triggering event, the GUI manager 108c may display a wait screen together with wait screen content such as pre-show video, as described above. Additionally, as with the GUI manager 108a on the broadcaster client device 106, GUI manager 108c may minimize the viewer display interface 602 to enable the viewer 116a to navigate content within the social networking application 108 while waiting for the broadcast to begin.

Upon the social networking system 101 determining that the audience satisfies the triggering event, on the other hand, the GUI manager 108c may also present the video stream. Additionally, the GUI manager 108c may communicate with the user input detector 108d. In particular, in response to the user input detector 108d detecting user input from viewer 116a in the form of a selection to view a broadcast, the GUI manager 108c may display content related to the broadcast within the viewer display interface 602.

As shown in FIG. 7, the social networking system 101 can communicate with the social networking application 108 on both the broadcaster client device 106 and the viewer client device 114a. Additionally, the social networking system 101 can include various components for performing the processes and features described herein. For example, in the embodiment shown in FIG. 7, the social networking system 101 includes a video manager 702, a broadcast manager 704, a content manager 706, a triggering event manager 708, and a social graph 710.

The components 702-710 of the social networking system 101 can comprise software, hardware, or both. For example, the components 702-710 can comprise one or more instructions stored on a computer-readable storage medium and executable by processors of one or more computing devices, such as a client device or server device. When executed by the one or more processors, the computer-executable instructions of the social networking system 101 can cause the computing device(s) to perform the video presentation and live polling methods described herein. Alternatively, the components 702-712 can comprise hardware such as a special purpose processing device to perform a certain function or group of functions. Alternatively still, the components 702-712 of the social networking system 101 can comprise a combination of computer-executable instructions and hardware.

As mentioned above, the social networking system 101 includes a video manager 702. In general, the video manager 702 assists in receiving the video stream from the broadcaster client device 106 and providing the video stream to the viewer client device 114a. In particular, the video manager 702 may simultaneously receive the video stream from the broadcaster client device 106 and transmit the video stream to the viewer client device 114a for a "live" video stream presentation. In other embodiments, the video manager 702 may transmit the video stream to the viewer client device 114a only upon further receiving an indication from the broadcaster client device 106 (e.g., a user input by the broadcaster 110 detected by the user input detector 108b) that the broadcaster 110 wants to broadcast the video stream for viewer 116a to view. In any of these embodiments, the video manager 702 may communicate with the other elements or components of the social networking system 101 such as the broadcast manager 704 and/or the content manager 706 discussed below.

The social networking system 101 also includes a broadcast manager 704. In particular, the broadcast manager 704 manages the initialization of the live broadcast. For example, when the broadcaster 110 selects an option to begin a live broadcast, the broadcaster client device 106 begins transmitting a video stream, and the social networking system 101 receives the video stream by way of the video manager 702 as discussed above. However, in embodiments where the audience does not satisfy the triggering event, the social networking system 101 does not begin transmitting the video stream to the viewer client device 114a. The broadcast manager 704 maintains the live broadcast as a communication channel between the broadcaster client device 106 and the viewer client device 114a but with no live video stream. In these embodiments, the broadcast manager 704 may communicate with the content manager 706 and the triggering event manager 708 to determine what to include within the broadcast to the viewer client device 114a. In this way, a live broadcast may simply be a communication channel initiated at the broadcaster client device 106, opened by social networking system 101, and joined at the viewer client device 114a.

The social networking system 101 further includes a content manager 706. In particular, the content manager 706 can communicate with the GUI manager 108a in the social networking application 108 on the broadcaster client device 106 as well as the GUI manager 108c in the social networking application 108 on the viewer client device 114a. By communicating with GUI manager 108a and GUI manager 108c, the content manager 706 can provide all elements and features related to the live broadcast. In other words, the content manager 706 can provide the wait screen content, user-selectable options, and social networking application content to the viewer client device 114*a* and the broadcaster client device 106.

As mentioned and as shown in FIG. 7, the social networking system 101 also includes a triggering event manager 708. In particular, the triggering event manager 708 can communicate with the social networking application 108 on both the broadcaster client device 106 and the viewer client device 114*a* to notify each respective device as to whether the audience satisfies the triggering event. For example, the triggering event manager 708 monitors the number of viewers in the audience and/or the identity of each viewer added to the audience. When the threshold number of viewers is reached (or when a particular viewer is added to the audience), thereby satisfying the triggering event, the triggering event manager 708 communicates with the content manager 706 and the video manager 702 to provide the relevant content to the broadcaster client device 106 and the viewer client device 114*a*.

In one or more embodiments, the social networking system 101 also includes a social graph 710. The social graph includes node information 712 and edge information 714. Node storage of the social graph 710 can store node information 712 comprising nodes for users, nodes for concepts, nodes for transactions, and nodes for items. Edge storage of the social graph 710 can store edge information 714 comprising relationships between nodes and/or actions occurring within the social networking system 101 or a different social networking system. Further detail regarding the social networking system, social graphs, edges, and nodes is presented below with respect to FIGS. 11-12.

Figure 8:
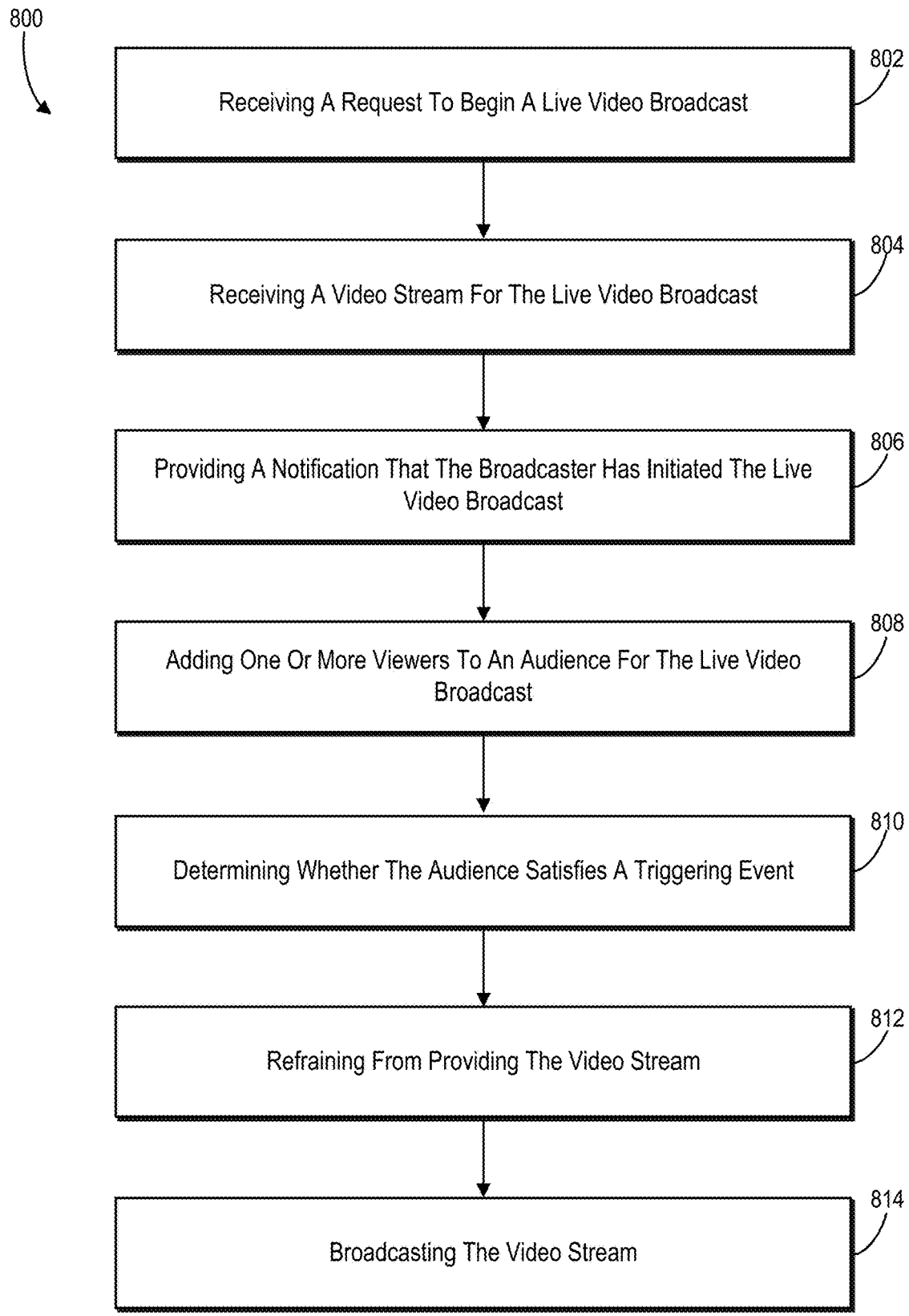
FIG. 8 illustrates a flowchart of a series of acts in a method of triggering a live video broadcast in accordance with one or more embodiments.

FIG. 8 illustrates a flowchart of a method 800 of triggering a live broadcast of a video stream. The method 800 includes an act 802 of receiving a request to begin a live video broadcast. In particular, the act 802 involves receiving, from a broadcaster client device associated with a broadcaster, a request to begin a live video broadcast.

As illustrated by FIG. 8, the method 800 further includes an act 804 of receiving a video stream for the live video broadcast. In particular, the act 804 involves receiving, from the broadcaster client device, a video stream for the live video broadcast.

From FIG. 8, the method 800 includes an act 806 of providing a notification that the broadcaster has initiated the live video broadcast. In particular, the act 806 may involve providing, to a plurality of viewer client devices, a notification that the broadcaster has initiated the live video broadcast.

Additionally, the method 800 includes a further act 808 of adding one or more viewers to an audience for the live video broadcast. In particular, the act 808 may involve adding, based on requests received from one or more viewer client devices, one or more viewers to an audience for the live video broadcast. As described above, the social networking system 101 receives a request from a viewer client device (e.g., viewer client device 114*a*) to view a live video broadcast, and the social networking system 101 adds viewers to the audience for the live video broadcast.

The method 800 also includes an act 810 of determining whether the audience satisfies a triggering event. In particular, the act 810 may involve determining whether the audience satisfies a triggering event associated with the live video broadcast. As discussed above, the social networking system 101 determines, in some embodiments, whether a threshold number of viewers have been added to the audience (e.g., whether the audience satisfies a threshold number of viewers). In other embodiments, the social networking system 101 determines whether a particular viewer has been added to the audience to satisfy the triggering event.

As shown in FIG. 8, the method 800 also includes an act 812 of refraining from providing the video stream. In particular, the act 812 may involve, in response to determining that the audience does not satisfy the triggering event, refraining from providing the video stream to the one or more viewer client devices.

The method 800 further includes an act 814 of broadcasting the video stream. In particular, the act 812 may involve, in response tot determining that the audience does satisfy the triggering event, broadcasting the video stream to the one or more viewer client devices.

In some embodiments, the method 800 further includes an act of providing a running total of a number of viewers added to the audience. In particular, the act includes providing, to the broadcaster client device, a running total of the number of viewers added to the audience by the social networking system. In some embodiments, the running total is an incrementing counter that increases with each addition of a new viewer for the live broadcast, as described above.

In the same or other embodiments, the method 800 further includes an act of providing, to the broadcaster client device, a notification of an identity of each individual viewer that is added to the audience. As described above, the social networking system 101 provides information to the broadcaster client device 106 regarding the profile of each viewer that selects an option to view the broadcast.

In additional or alternative embodiments, the method 800 includes an act of causing, in further response to determining that the audience does not satisfy the triggering event, a social networking application on the broadcaster client device to: minimize a display of the live video broadcast, and enable the broadcaster to navigate content within the social networking application.

In these or other embodiments, the method 800 further includes an act of providing, to the one or more viewer client devices, content for a wait screen. In particular, in some embodiments the content for the wait screen includes a notification that broadcasting the video stream has begun. Additionally or alternatively, the content for the wait screen includes pre-show content associated with the broadcaster. In particular the pre-show content includes, for example, an introduction video and an estimated time remaining until broadcasting the video stream begins.

The method 800 additionally or alternatively includes an act of enabling, in further response to determining that the audience does not satisfy the triggering event, each viewer associated with the one or more viewer client devices, by way of each respective viewer client device, to navigate content within an application (e.g., messaging application, social networking application, etc.) associated with viewing the live video broadcast.

Furthermore, the method 800 may include an act of causing, in response to determining that the audience does not satisfy the triggering event, each of the one or more viewer client devices to minimize a display window for the video stream. Relatedly, the method 800 may also include an act of causing, in response to determining that the audience does satisfy the triggering event, each of the one or more viewer client devices to maximize a display window to present the video stream. Additionally or alternatively, the method 800 may include a further act of providing, in response to determining that the audience does satisfy the triggering event, a notification signifying that broadcasting the video stream has begun. Furthermore, the method 800 may include an act of providing, in further response to determining that the audience does satisfy the triggering event, a countdown to begin broadcasting the video stream.

Figure 9:
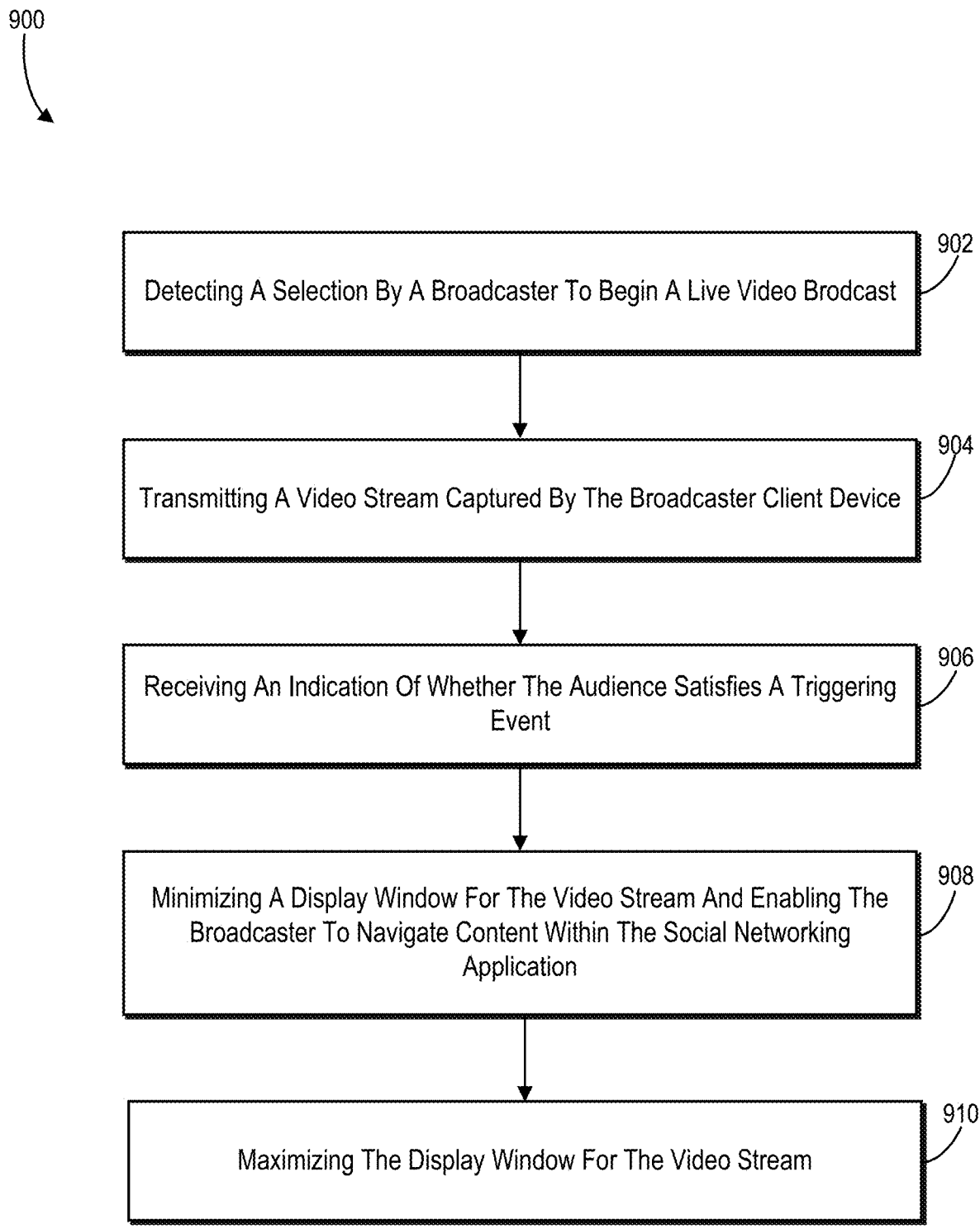
FIG. 9 illustrates a flowchart of a series of acts in a method of presenting a user interface for triggering a live video broadcast in accordance with one or more embodiments.

FIG. 9 illustrates a flowchart of a method 900 of providing a video stream for a live broadcast from a broadcaster client device. The method 900 includes an act 902 of detecting a selection by a broadcaster to begin a live video broadcast. In particular, the act 902 may involve detecting, by way of a broadcaster client device, a selection by a broadcaster to begin a live video broadcast via a social networking application.

As illustrated by FIG. 9, the method 900 includes an act 904 of transmitting a video stream captured by the broadcaster client device. In particular, the act 904 involves transmitting, to one or more server devices, a video stream captured by the broadcaster client device for the live video broadcast.

The method 900 further includes an act 906 of receiving an indication of whether the audience satisfies a triggering event. In particular, the act 906 may involve receiving, from the one or more server devices, an indication of whether the audience satisfies a triggering event.

As further illustrated by FIG. 9, the method 900 includes an act 908 of minimizing a display window for the video stream and enabling the broadcaster to navigate content within the social networking application. In particular, the act 908 may involve, prior to receiving an indication that the audience satisfies the triggering, minimizing a display window for the video stream on the broadcaster client device and enabling the broadcaster to navigate content within the social networking application.

The method 900 also includes an act 910 of maximizing the display window for the video stream. In particular, the act 910 involves, in response to receiving the indication that the audience satisfies the triggering event, maximizing the display window for the video stream on the broadcaster client device.

In one or more embodiments, the method 900 may further include an act of presenting, in further response to receiving the indication that the audience satisfies the triggering event, a countdown to begin broadcasting the video stream on the display of the broadcaster client device.

In the same or other embodiments, the method 900 may include an act of presenting, prior to receiving an indication that the audience satisfies the triggering event, a virtual waiting room on the display of the broadcast client device. For example, the presenting the virtual waiting room may include presenting, on the display of the broadcaster client device, comments from viewers who have joined the audience. Additionally or alternatively, presenting the virtual waiting room may include presenting, on the display of the broadcaster client device, a notification that the triggering event has not yet been satisfied.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
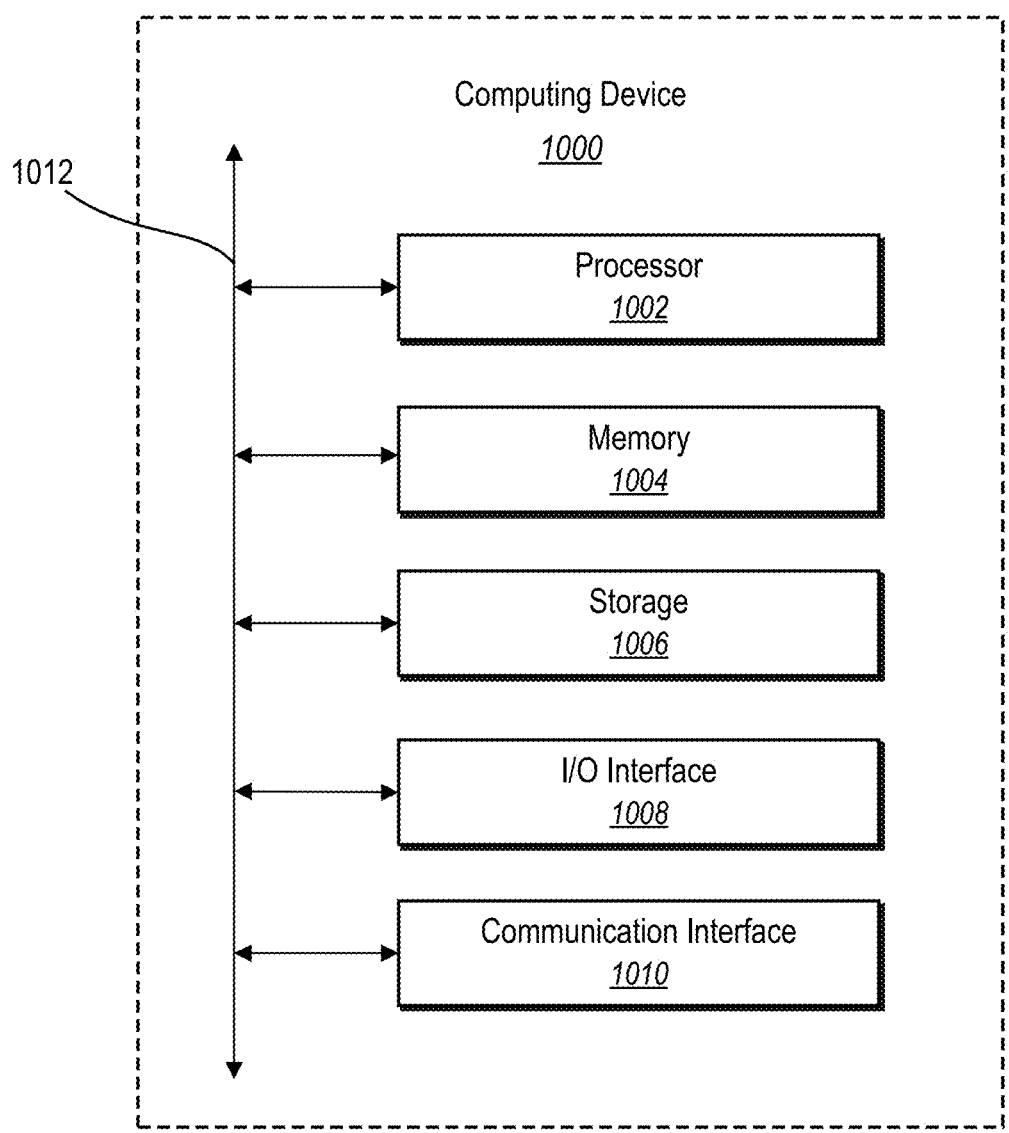
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the social networking system. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touchscreen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the social networking system can comprise a social-networking system. A social-networking system may enable its users (such as persons or organizations) to interact with the system and with each other. As mentioned above, the social networking system can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 11:
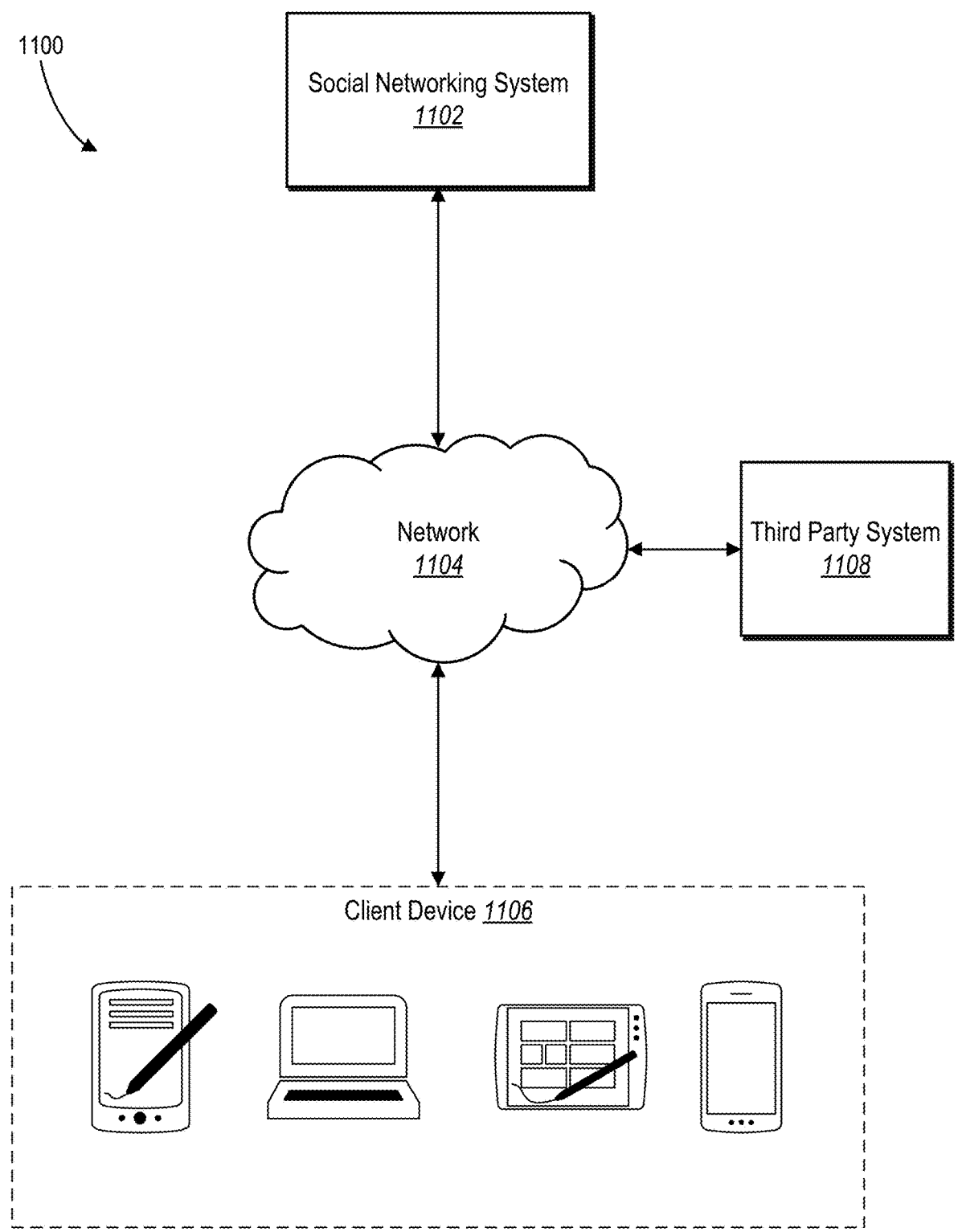
FIG. 11 illustrates an example social network system in accordance with one or more embodiments.

FIG. 11 illustrates an example network environment 1100 of a social-networking system. Network environment 1100 includes a client system 1106, a social-networking system 1102, and a third-party system 1108 connected to each other by a network 1104. Although FIG. 11 illustrates a particular arrangement of client system 1106, social-networking system 1102, third-party system 1108, and network 1104, this disclosure contemplates any suitable arrangement of client system 1106, social-networking system 1102, third-party system 1108, and network 1104. As an example and not by way of limitation, two or more of client system 1106, social-networking system 1102, and third-party system 1108 may be connected to each other directly, bypassing network 1104. As another example, two or more of client system 1106, social-networking system 1102, and third-party system 1108 may be physically or logically co-located with each other in whole or in part. Moreover, although FIG. 11 illustrates a particular number of client systems 1106, social-networking systems 1102, third-party systems 1108, and networks 1104, this disclosure contemplates any suitable number of client systems 1106, social-networking systems 1102, third-party systems 1108, and networks 1104. As an example and not by way of limitation, network environment 1100 may include multiple client system 1106, social-networking systems 1102, third-party systems 1108, and networks 1104.

This disclosure contemplates any suitable network 1104. As an example and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client system 1106, social-networking system 1102, and third-party system 1108 to communication network 1104 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client system 1106 may be an electronic device including hardware, software, or embedded logic components or a combination of two or more such components and capable of carrying out the appropriate functionalities implemented or supported by client system

1106. As an example and not by way of limitation, a client system 1106 may include any of the computing devices discussed above in relation to FIG. 11. A client system 1106 may enable a network user at client system 1106 to access network 1104. A client system 1106 may enable its user to communicate with other users at other client systems 1106.

In particular embodiments, client system 1106 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1106 may enter a Uniform Resource Locator (URL) or other address directing the web browser to a particular server (such as server, or a server associated with a third-party system 1108), and the web browser may generate a Hyper Text Transfer Protocol (HTTP) request and communicate the HTTP request to server. The server may accept the HTTP request and communicate to client system 1106 one or more Hyper Text Markup Language (HTML) files responsive to the HTTP request. Client system 1106 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1102 may be a network-addressable computing system that can host an online social network. Social-networking system 1102 may generate, store, receive, and send social-networking data, such as, for example, user-profile data, concept-profile data, social-graph information, or other suitable data related to the online social network. Social-networking system 1102 may be accessed by the other components of network environment 1100 either directly or via network 1104. In particular embodiments, social-networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1106, a social-networking system 1102, or a third-party system 1108 to manage, retrieve, modify, add, or delete, the information stored in data store.

In particular embodiments, social-networking system 1102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 1102 may provide users of the online social network the ability to communicate and interact with other users. In particular embodiments, users may join the online social network via social-networking system 1102 and then add connections (e.g., relationships) to a number of other users of social-networking system 1102 whom they want to be connected to. Herein, the term "friend" may refer to any other user of social-networking system 1102 with whom a user has formed a connection, association, or relationship via social-networking system 1102.

In particular embodiments, social-networking system 1102 may provide users with the ability to take actions on various types of items or objects, supported by social-networking system 1102. As an example and not by way of limitation, the items and objects may include groups or social networks to which users of social-networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1102 or by an external system of third-party system 1108, which is separate from social-networking system 1102 and coupled to social-networking system 1102 via a network 1104.

In particular embodiments, social-networking system 1102 may be capable of linking a variety of entities. As an example and not by way of limitation, social-networking system 1102 may enable users to interact with each other as well as receive content from third-party systems 1108 or other entities, or to allow users to interact with these entities through an application programming interfaces (API) or other communication channels.

In particular embodiments, a third-party system 1108 may include one or more types of servers, one or more data stores, one or more interfaces, including but not limited to APIs, one or more web services, one or more content sources, one or more networks, or any other suitable components, e.g., that servers may communicate with. A third-party system 1108 may be operated by a different entity from an entity operating social-networking system 1102. In particular embodiments, however, social-networking system 1102 and third-party systems 1108 may operate in conjunction with each other to provide social-networking services to users of social-networking system 1102 or third-party systems 1108. In this sense, social-networking system 1102 may provide a platform, or backbone, which other systems, such as third-party systems 1108, may use to provide social-networking services and functionality to users across the Internet.

In particular embodiments, a third-party system 1108 may include a third-party content object provider. A third-party content object provider may include one or more sources of content objects, which may be communicated to a client system 1106. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1102 also includes user-generated content objects, which may enhance a user's interactions with social-networking system 1102. User-generated content may include anything a user can add, upload, send, or "post" to social-networking system 1102. As an example and not by way of limitation, a user communicates posts to social-networking system 1102 from a client system 1106. Posts may include data such as status updates or other textual data, location information, photos, videos, links, music or other similar data or media. Content may also be added to social-networking system 1102 by a third-party through a "communication channel," such as a newsfeed or stream.

In particular embodiments, social-networking system 1102 may include a variety of servers, sub-systems, programs, modules, logs, and data stores. In particular embodiments, social-networking system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1102 may also include suitable components such as network interfaces, security mechanisms, load balancers, failover servers, management-and-network-operations consoles, other suitable components, or any suitable combination thereof. In particular embodiments, social-networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1102 to one or more client systems 1106 or one or more third-party system 1108 via network 1104. The web server may include a mail server or other messaging functionality for receiving and routing messages between social-networking system 1102 and one or more client systems 1106. An API-request server may allow a third-party system 1108 to access information from social-networking system 1102 by calling one or more APIs. An action logger may be used to receive communications from a web server about a user's actions on or off social-networking system 1102. In conjunction with the action log, a third-party-content-object log may be maintained of user exposures to third-party-content objects. A notification controller may provide information regarding content objects to a client system 1106. Information may be pushed to a client system 1106 as notifications, or information may be pulled from client system 1106 responsive to a request received from client system 1106. Authorization servers may be used to enforce one or more privacy settings of the users of social-networking system 1102. A privacy setting of a user determines how particular information associated with a user can be shared. The authorization server may allow users to opt in to or opt out of having their actions logged by social-networking system 1102 or shared with other systems (e.g., third-party system 1108), such as, for example, by setting appropriate privacy settings. Third-party-content-object stores may be used to store content objects received from third parties, such as a third-party system 1108. Location stores may be used for storing location information received from client systems 1106 associated with users. Advertisement-pricing modules may combine social information, the current time, location information, or other suitable information to provide relevant advertisements, in the form of notifications, to a user.

Figure 12:
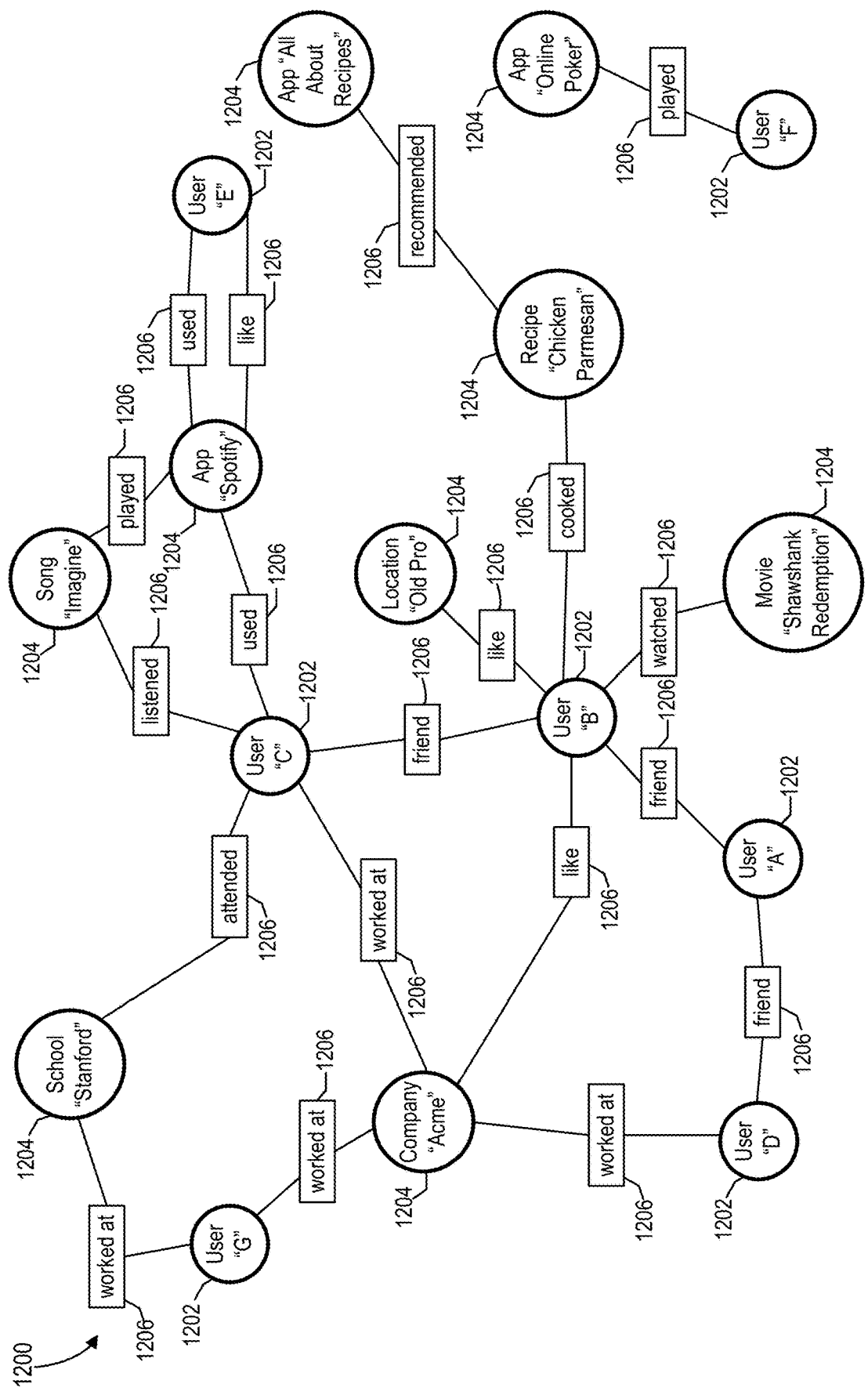
FIG. 12 illustrates a social graph in accordance with one or more embodiments.

FIG. 12 illustrates example social graph 1200. In particular embodiments, social-networking system 1102 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a social-networking system 1102, client system 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of social-networking system 1102. As an example and not by way of limitation, a user may be an individual (human user), an entity (e.g., an enterprise, business, or third-party application), or a group (e.g., of individuals or entities) that interacts or communicates with or over social-networking system 1102. In particular embodiments, when a user registers for an account with social-networking system 1102, social-networking system 1102 may create a user node 1202 corresponding to the user, and store the user node 1202 in one or more data stores. Users and user nodes 1202 described herein may, where appropriate, refer to registered users and user nodes 1202 associated with registered users. In addition or as an alternative, users and user nodes 1202 described herein may, where appropriate, refer to users that have not registered with social-networking system 1102. In particular embodiments, a user node 1202 may be associated with information provided by a user or information gathered by various systems, including social-networking system 1102. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1204 may correspond to a concept. As an example and not by way of limitation, a concept may correspond to a place (such as, for example, a movie theater, restaurant, landmark, or city); a website (such as, for example, a website associated with social-network system 1102 or a third-party website associated with a web-application server); an entity (such as, for example, a person, business, group, sports team, or celebrity); a resource (such as, for example, an audio file, video file, digital photo, text file, structured document, or application) which may be located within social-networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including social-networking system 1102. As an example and not by way of limitation, information of a concept may include a name or a title; one or more images (e.g., an image of the cover page of a book); a location (e.g., an address or a geographical location); a web site (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to social-networking system 1102. Profile pages may also be hosted on third-party websites associated with a third-party server 1108. As an example and not by way of limitation, a profile page corresponding to a particular external webpage may be the particular external webpage and the profile page may correspond to a particular concept node 1204. Profile pages may be viewable by all or a selected subset of other users. As an example and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1106 to send to social-networking system 1102 a message indicating the user's action. In response to the message, social-networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example and not by way of limitation, a first user may indicate that a second user is a "friend" of the first user. In response to this indication, social-networking system 1102 may send a "friend request" to the second user. If the second user confirms the "friend request," social-networking system 1102 may create an edge 1206 connecting the first user's user node 1202 to the second user's user node 1202 in social graph 1200 and store edge 1206 as social-graph information in one or more data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example and not by way of limitation, as illustrated in FIG. 12, a user may "like," "attended," "played," "listened," "cooked," "worked at," or "watched" a concept, each of which may correspond to a edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, social-networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, social-networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, social-networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client system 1106) may indicate that he or she likes the concept represented by the concept node 1204 by clicking or selecting a "Like" icon, which may cause the user's client system 1106 to send to social-networking system 1102 a message indicating the user's liking of the concept associated with the concept-profile page. In response to the message, social-networking system 1102 may create an edge 1206 between user node 1202 associated with the user and concept node 1204, as illustrated by "like" edge 1206 between the user and concept node 1204. In particular embodiments, social-networking system 1102 may store an edge 1206 in one or more data stores. In particular embodiments, an edge 1206 may be automatically formed by social-networking system 1102 in response to a particular user action. As an example and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 1102 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 1102) or RSVP (e.g., through social-networking system 1102) to an event associated with the advertisement. In addition or as an alternative, an advertisement may include social-networking-system context directed to the user. As an example and not by way of limitation, an advertisement may display information about a friend of the user within social-networking system 1102 who has taken an action associated with the subject matter of the advertisement.

In particular embodiments, social-networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1102 may calculate a coefficient based on a user's actions. Social-networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Social-networking system 1102 may analyze a user's actions to determine whether one or more of the actions indicate an affinity for subject matter, content, other users, and so forth. As an example and not by way of limitation, if a user may make frequently posts content related to "coffee" or variants thereof, social-networking system 1102 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1102 may calculate a coefficient based on the type of relationship between particular objects. Referencing the social graph 1200, social-networking system 1102 may analyze the number and/or type of edges 1206 connecting particular user nodes 1202 and concept nodes 1204 when calculating a coefficient. As an example and not by way of limitation, user nodes 1202 that are connected by a spouse-type edge (representing that the two users are married) may be assigned a higher coefficient than user nodes 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1102 may determine that the user has a higher coefficient with respect to the first photo than the second photo because having a tagged-in-type relationship with content may be assigned a higher weight and/or rating than having a like-type relationship with content. In particular embodiments, social-networking system 1102 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1102 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1200. As an example and not by way of limitation, social-graph entities that are closer in the social graph 1200 (i.e., fewer degrees of separation) may have a higher coefficient than entities that are further apart in the social graph 1200.

In particular embodiments, social-networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1106 of the user). A first user may be more interested in other users or concepts that are closer to the first user. As an example and not by way of limitation, if a user is one mile from an airport and two miles from a gas station, social-networking system 1102 may determine that the user has a higher coefficient for the airport than the gas station based on the proximity of the airport to the user.

In particular embodiments, social-networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1102 may provide information that is relevant to user's interests and current circumstances, increasing the likelihood that they will find such information of interest. In particular embodiments, social-networking system 1102 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1102 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, social-networking system 1102 may calculate the coefficient (or access the coefficient information if it has previously been calculated and stored). In particular embodiments, social-networking system 1102 may measure an affinity with respect to a particular process. Different processes (both internal and external to the online social network) may request a coefficient for a particular object or set of objects. Social-networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/9,711,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by social-networking system 1102 or shared with other systems (e.g., third-party system 1108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 1102 may send a request to the data store for the object. The request may identify the user associated with the request and may only be sent to the user (or a client system 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
receiving, from a broadcaster device associated with a broadcaster, a live video stream captured by the broadcaster device;
receiving, from the broadcaster device, an indication of an input by the broadcaster to begin a live video broadcast of the live video stream;
providing, to a plurality of viewer devices, a notification that the broadcaster has initiated the live video broadcast;
determining an expected participation for the live video broadcast;
determining, based on the expected participation for the live video broadcast, a threshold percentage of followers associated with the broadcaster required to initiate the live video broadcast;
refraining from beginning the live video broadcast until the audience of viewer devices satisfies the threshold percentage of the followers;
receiving, from one or more viewer devices of the plurality of viewer devices, requests to view the live video broadcast;
adding, as the requests to view the live video broadcast are received, the one or more viewer devices to the audience for the live video broadcast;
determining, as the viewer devices are added to the audience, that the audience satisfies the threshold percentage of the followers; and
in response to determining that the audience satisfies the threshold percentage of the followers, broadcasting the live video stream to the one or more viewer devices in the audience.

2. The method of claim 1, wherein determining the expected participation for the live video broadcast comprises determining an expected participation during a time associated with the live video broadcast.

3. The method of claim 1, wherein refraining from beginning the live video broadcast comprises refraining from providing the live video stream to the one or more viewer devices in the audience until the audience reaches the threshold percentage of followers.

4. The method of claim 1, further comprising providing, for display on the broadcaster device, a running total of a number of viewer devices added to the audience as the requests to view the live video broadcast are received.

5. The method of claim 1, further comprising providing, for display on the broadcaster device, notifications of viewer identities associated with the one or more viewer devices added to the audience.

6. The method of claim 1, further comprising:
while refraining from beginning the live video broadcast:
enabling a social networking application of the broadcaster device to minimize a display window of the live video stream; and
enabling the broadcaster to navigate content within the social networking application.

7. The method of claim 1, further comprising providing, for display on the one or more viewer devices while refraining from beginning the live video broadcast, content for a wait screen.

8. The method of claim 7, wherein the content for the wait screen comprises a notification that the live video broadcast has not begun.

9. The method of claim 7, wherein the content for the wait screen comprises pre-show content associated with the broadcaster, wherein the pre-show content comprises an introduction video and an estimated time remaining until the live video broadcast begins.

10. The method of claim 1, further comprising, while refraining from beginning the live video broadcast, enabling viewers associated with the one or more viewer devices to navigate content within a social networking application associated with viewing the live video broadcast.

11. The method of claim 10, further comprising, while refraining from beginning the live video broadcast, enabling the social networking application to minimize a display window for the live video broadcast.

12. The method of claim 11, further comprising, in further response to determining that the audience satisfies the threshold percentage of the followers, causing the one or more viewer devices to maximize the display window to present the live video broadcast.

13. The method of claim 1, further comprising, in further response to determining that the audience satisfies the threshold percentage of the followers, causing the one or more viewer devices to display a countdown to beginning the live video broadcast.

14. A system comprising:
a computing device comprising at least one processor; and
a non-transitory computer readable medium comprising instructions that, when executed by the at least one processor, cause the system to:
receive, from a broadcaster device associated with a broadcaster, a live video stream captured by the broadcaster device;
receive, from the broadcaster device, an indication of an input by the broadcaster to begin a live video broadcast of the live video stream;
provide, to a plurality of viewer devices, a notification that the broadcaster has initiated the live video broadcast;
determine an expected participation for the live video broadcast;
determine, based on the expected participation for the live video broadcast, a threshold percentage of followers associated with the broadcaster required to initiate the live video broadcast;
refrain from beginning the live video broadcast until the audience of viewer devices satisfies the threshold percentage of the followers;
receive, from one or more viewer devices of the plurality of viewer devices, requests to view the live video broadcast;
add, as the requests to view the live video broadcast are received, the one or more viewer devices to the audience for the live video broadcast;
determine, as the viewer devices are added to the audience, that the audience satisfies the threshold percentage of the followers; and
in response to determining that the audience satisfies the threshold percentage of the followers, broadcast the live video stream to the one or more viewer devices in the audience.

15. The system of claim 14, wherein the instructions cause the system to determine the expected participation for the live video broadcast by determining an expected participation during a time associated with the live video broadcast.

16. The system of claim 14, wherein the instructions cause the system to refrain from beginning the live video broadcast by refraining from providing the live video stream to the one or more viewer devices in the audience until the audience reaches the threshold percentage of followers.

17. The system of claim 14, further comprising instructions that, when executed by the at least one processor, cause the system to provide, for display on the one or more viewer devices while refraining from beginning the live video broadcast, content for a wait screen.

18. A non-transitory computer readable medium comprising instructions that, when executed by at least one processor, cause a computer device to:
receive, from a broadcaster device associated with a broadcaster, a live video stream captured by the broadcaster device;
receive, from the broadcaster device, an indication of an input by the broadcaster to begin a live video broadcast of the live video stream;
provide, to a plurality of viewer devices, a notification that the broadcaster has initiated the live video broadcast;
determine an expected participation for the live video broadcast;
determine, based on the expected participation for the live video broadcast, a threshold percentage of followers associated with the broadcaster required to initiate the live video broadcast;
refrain from beginning the live video broadcast until the audience of viewer devices satisfies the threshold percentage of the followers;
receive, from one or more viewer devices of the plurality of viewer devices, requests to view the live video broadcast;
add, as the requests to view the live video broadcast are received, the one or more viewer devices to the audience for the live video broadcast;
determine, as the viewer devices are added to the audience, that the audience satisfies the threshold percentage of the followers; and
in response to determining that the audience satisfies the threshold percentage of the followers, broadcast the live video stream to the one or more viewer devices in the audience.

19. The non-transitory computer readable medium of claim 18, wherein the instructions cause the computer device to determine the expected participation for the live video broadcast by determining an expected participation during a time associated with the live video broadcast.

20. The non-transitory computer readable medium of claim 18, wherein the instructions cause the computer device to refrain from beginning the live video broadcast by refraining from providing the live video stream to the one or more viewer devices in the audience until the audience reaches the threshold percentage of followers.

* * * * *